US010694052B2

(12) United States Patent
Asai

(10) Patent No.: US 10,694,052 B2
(45) Date of Patent: Jun. 23, 2020

(54) NON-TRANSITORY COMPUTER-READABLE MEDIUM STORING OUTPUT INSTRUCTIONS TO CONTROL PORTABLE TERMINAL AND PORTABLE TERMINAL

(71) Applicant: BROTHER KOGYO KABUSHIKI KAISHA, Nagoya-shi, Aichi-ken (JP)

(72) Inventor: Norihiko Asai, Tajimi (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 532 days.

(21) Appl. No.: 15/172,307

(22) Filed: Jun. 3, 2016

(65) Prior Publication Data
US 2016/0357405 A1 Dec. 8, 2016

(30) Foreign Application Priority Data

Jun. 5, 2015 (JP) ................. 2015-114454

(51) Int. Cl.
*G06F 3/0484* (2013.01)
*G06F 3/0481* (2013.01)
*H04N 1/00* (2006.01)

(52) U.S. Cl.
CPC ..... *H04N 1/00307* (2013.01); *H04N 1/00411* (2013.01); *H04N 2201/0094* (2013.01)

(58) Field of Classification Search
CPC ........... H04N 1/00411; H04N 1/00307; H04N 2201/0094; G06F 3/04842; G06F 3/04817
See application file for complete search history.

(56) References Cited

U.S. PATENT DOCUMENTS 6,513,073 B1 * 1/2003 Kawai ................ G06F 3/1288 710/1
9,798,516 B2 * 10/2017 Chang ................ H04L 12/2805
2006/0050296 A1 * 3/2006 Suto .................. G06F 3/1222 358/1.15

(Continued)

FOREIGN PATENT DOCUMENTS

JP 2006-163990 A 6/2006
JP 2012-203742 A 10/2012

*Primary Examiner* — Shourjo Dasgupta
(74) *Attorney, Agent, or Firm* — Scully Scott Murphy and Presser

(57) ABSTRACT

A portable terminal includes: a display; a user interface; a memory; a network interface; and a controller, the controller performs performing a deciding processing of deciding the display mode of instructions objects corresponding to the external instructions specified in the first specifying processing, based on attribute information; performing a display control processing of controlling the display to display a selection screen including instructions objects having the display mode decided in the deciding processing; performing a first receiving processing of receiving a user operation of selecting an object included in the selection screen, via the user interface; performing, in response to the operation of selecting a instructions object in the first receiving processing, an activation processing of activating an external instructions corresponding to the selected object; performing an designation information acquiring processing of acquiring designation information from the external instructions activated in the activation processing.

10 Claims, 12 Drawing Sheets

(56) References Cited

U.S. PATENT DOCUMENTS

| | | | | |
|---|---|---|---|---|
| 2007/0016902 A1* | 1/2007 | Shozaki | ............... | G06F 8/61 |
| | | | | 717/174 |
| 2008/0024818 A1* | 1/2008 | Ito | ............... | G06F 3/1204 |
| | | | | 358/1.15 |
| 2008/0244567 A1* | 10/2008 | Zhan | ............... | G06F 9/4415 |
| | | | | 717/178 |
| 2011/0304874 A1* | 12/2011 | Aharonson | ............... | H04N 1/00204 |
| | | | | 358/1.15 |
| 2012/0019867 A1* | 1/2012 | Prati | ............... | G06F 3/1204 |
| | | | | 358/1.15 |
| 2012/0052909 A1* | 3/2012 | Joh | ............... | G10L 15/22 |
| | | | | 455/557 |
| 2012/0243043 A1* | 9/2012 | Asai | ............... | H04N 1/00225 |
| | | | | 358/1.15 |
| 2013/0278484 A1* | 10/2013 | Hwang | ............... | G06F 3/1423 |
| | | | | 345/2.3 |
| 2015/0015508 A1* | 1/2015 | Song | ............... | G06F 3/04886 |
| | | | | 345/173 |
| 2015/0193674 A1* | 7/2015 | Ishiguro | ............... | G06F 3/1292 |
| | | | | 358/1.15 |
| 2015/0237493 A1* | 8/2015 | Won | ............... | G06F 3/04817 |
| | | | | 715/734 |

* cited by examiner

FIG. 3A

| PROGRAM ID | FIRST OPERATION ID | PRIORITY INFORMATION |
|---|---|---|
| 001 | PRINTING OPERATION | 5 |
| 002 | PRINTING OPERATION | 3 |
| 003 | — | 1 |
| 004 | FAX TRANSMITTING OPERATION | 5 |

FIG. 3B

| DEVICE ID | SECOND OPERATION ID |
|---|---|
| MFP-A | PRINTING OPERATION |

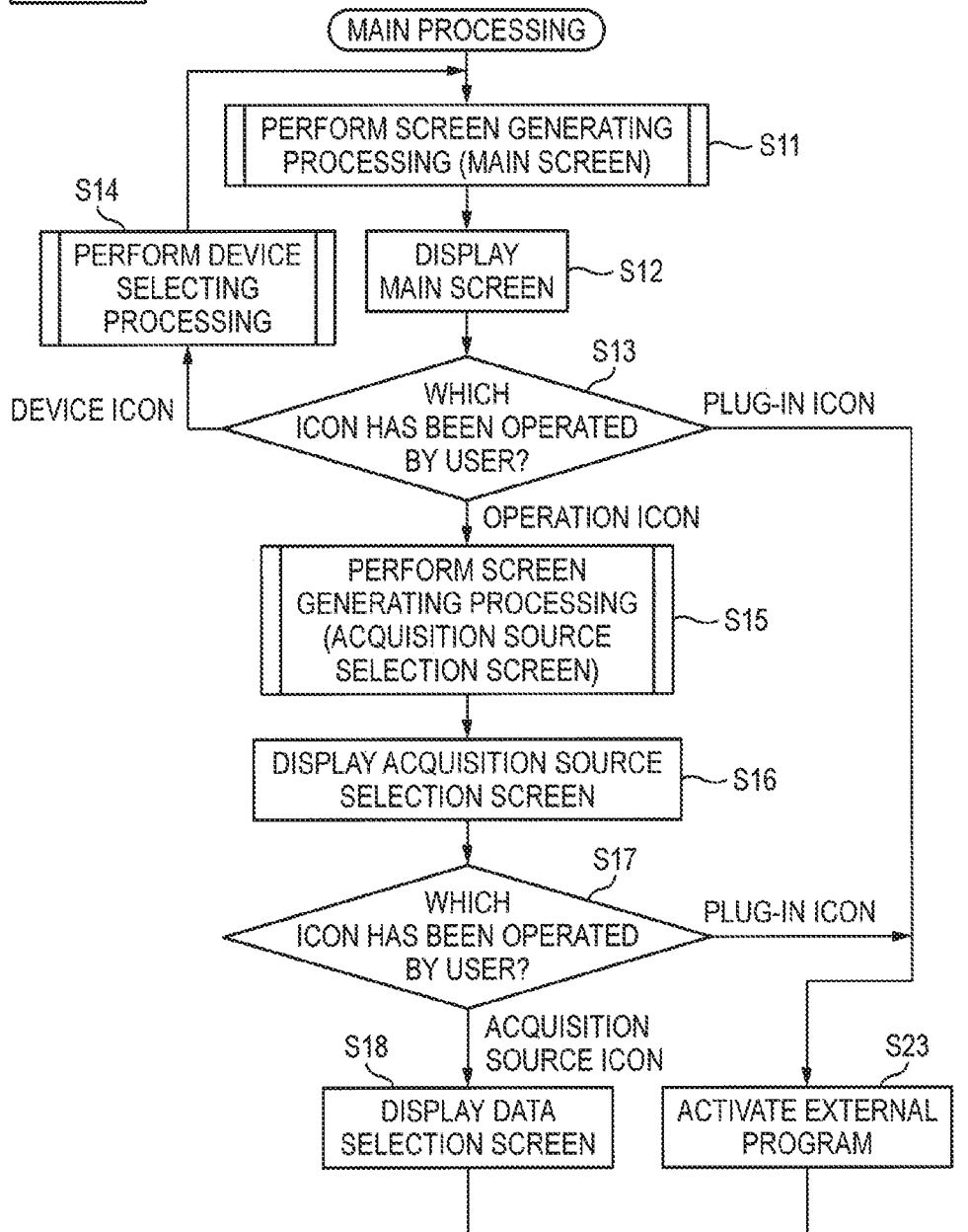

NON-TRANSITORY COMPUTER-READABLE MEDIUM STORING OUTPUT INSTRUCTIONS TO CONTROL PORTABLE TERMINAL AND PORTABLE TERMINAL

CROSS-REFERENCE TO RELATED APPLICATION

This application claims priority from Japanese Patent Application No. 2015-114454 filed on Jun. 5, 2015, the entire subject matter of which is incorporated herein by reference.

TECHNICAL FIELD

This disclosure relates to output instructions for making an output device perform an output operation, and a portable terminal for executing the output instructions.

BACKGROUND

For example, the background art discloses a printing application which causes a user to designate photo data, Web page data, or the like stored in a portable terminal and can make a printer print images based on the designated data. In a case where the user designates photo data, Web page data, or the like in the portable terminal, the printing application having the above described configuration can easily make a printer print the designated data.

SUMMARY

Recently, the types of data with demands for easy printing in portable terminals is increasing. However, it is impossible to implement a function of acquiring every type of data in a printing application. Also, not demands to make printers print data designated by users as they are, but demand to make printers print data subjected to some types of processing in portable terminals is increasing. However, it is impossible to implement a function of performing every type of processing on data in a printing application.

In view of the above, it is considered to add a function of acquiring data from external applications to a printing application. In this case, the printing application becomes able to acquire specific types of data from external applications, or becomes able to acquire data subjected to specific types of processing from external applications. However, when the number of external programs which are being provided increases, a problem that it becomes difficult to find a desired external program from many external programs may occur.

This disclosure is to provide output instructions having an interface enabling a user to easily find an external instructions for implementing a desired processing from a plurality of external instructions.

In view of the above, a non-transitory computer-readable medium stores an output instructions to control a portable terminal including a display, a user interface, a memory, and a network interface, the network interface being configured to be electrically connected to an output devices which is able to perform at least one of a plurality of output operations, the memory being configured to store a plurality of external instructions which are readable by the portable terminal, each of the external instructions causing the portable terminal to perform at least one of a processing of designating content data, which is to be a target of an output operation, a processing of designating an output destination, to which the content data is to be output by the output operation, and a processing of designating operation conditions of the output operation, the output instructions and the external instructions being executable by a processor. The output instructions cause the portable terminal to perform operations comprising: performing a first specifying processing of specifying external instructions stored in the memory; performing an attribute information acquiring processing of acquiring the attribute information of the external instructions specified in the first specifying processing, the attribute information including information associated with a processing content which is performed by the portable terminal due to the specified external instructions; performing a deciding processing of deciding the display mode of instructions objects corresponding to the external instructions specified in the first specifying processing, based on the attribute information; performing a display control processing of controlling the display to display a selection screen including the instructions objects having the display mode decided in the deciding processing; performing a first receiving processing of receiving a user operation of selecting an object included in the selection screen, via the user interface; performing, in response to the operation of selecting a instructions object in the first receiving processing, an activation processing of activating an external instructions corresponding to the selected object; performing an designation information acquiring processing of acquiring designation information from the external instructions activated in the activation processing, the designation information being information representing at least one of the content data, the output destination, and the operation conditions designated by the activated external instructions; and performing an output instructing processing of transmitting output instructing information generated based on the designation information, to the output device via the network interface, the output instructing information including information causing the output device to perform the output operation.

According to this disclosure, since the display mode of the instructions icons on the selection screen are determined based on the attribute information, it becomes easy for a user to find a external instructions for implementing a desired processing, from a plurality of external instructions.

BRIEF DESCRIPTION OF THE DRAWINGS

The foregoing and additional features and characteristics of this disclosure will become more apparent from the following detailed descriptions considered with the reference to the accompanying drawings, wherein:

FIGS. 3A and 3B show examples of information stored in a data storage area 62B, wherein FIG. 3A shows a program information list, and FIG. 3B shows a device information record;

FIG. 4A and FIG. 4B are a flow chart of a main processing;

FIGS. 8A and 8B show display examples of a display 53, wherein FIG. 8A shows a menu screen, and FIG. 8B shows a main menu which is displayed in a case where a MFP 10A has been designated as a designation device;

FIG. 9B shows a main menu which is displayed in a case where a MFP 10B has been designated as a designation device;

FIGS. 10A and 10B show display examples of the display 53, wherein FIG. 10A shows a data acquisition source selection screen, and FIG. 10B shows a photo data selection screen; and FIGS. 11A and 11B show display examples of the display 53, wherein FIG. 11A shows a preview screen, and FIG. 11B shows an example of a map designation screen.

DETAILED DESCRIPTION

Hereinafter, an embodiment of this disclosure will be described with reference to appropriate drawings. Also, it goes without saying that the embodiment to be described below is just an example of this disclosure, and the embodiment of this disclosure can be appropriately modified without changing the scope of this disclosure.

Figure 1:
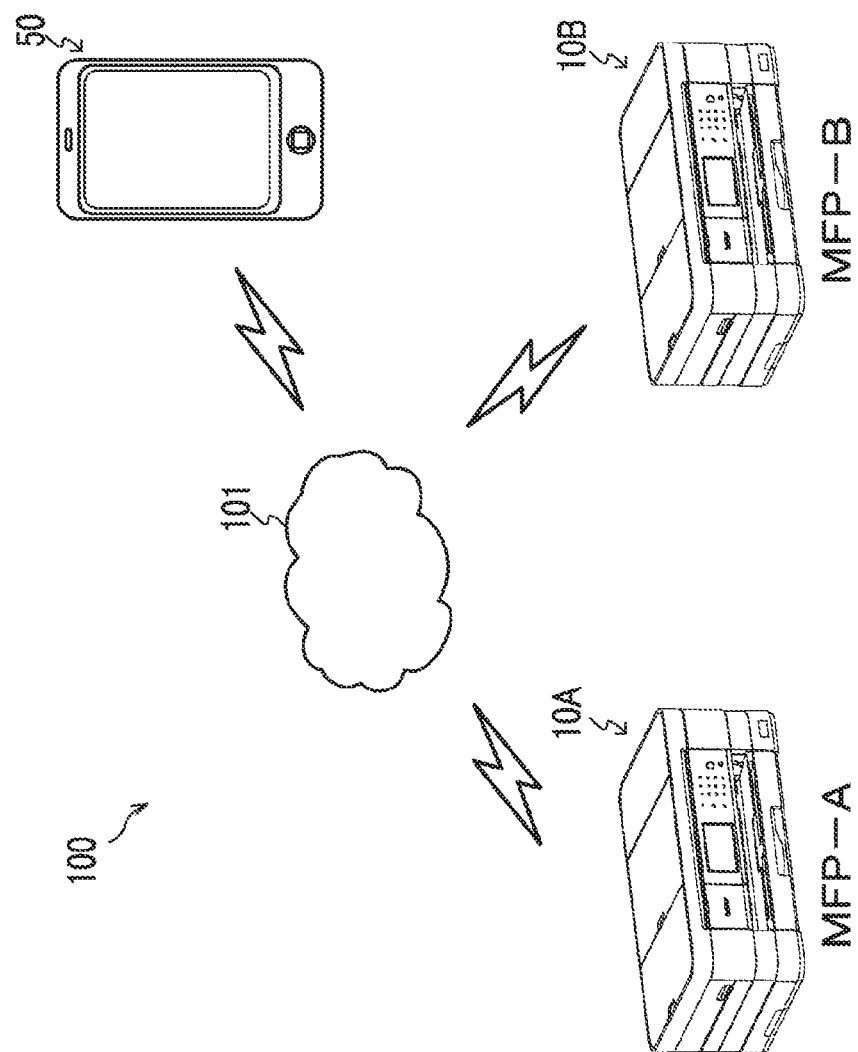
FIG. 1 is a view illustrating a schematic configuration of a recording system 100 according to an embodiment.

FIG. 1 is a view schematically illustrating a recording system 100 according to the present embodiment. The recording system 100 shown in FIG. 1 is composed of multi-function peripherals 10A and 10B (which hereinafter will also be referred to collectively as "MFPs 10") and a portable terminal 50. The MFPs 10 and the portable terminal 50 are electrically connected. The MFPs 10 and the portable terminal 50 may be connected via a communication network 101 such as a wired LAN or a wireless LAN, or may be connected by USB cables or the like. Also, a state where a plurality of devices is able to be communicated is an example of a state where the plurality of devices is electrically connected.

Figure 2A:
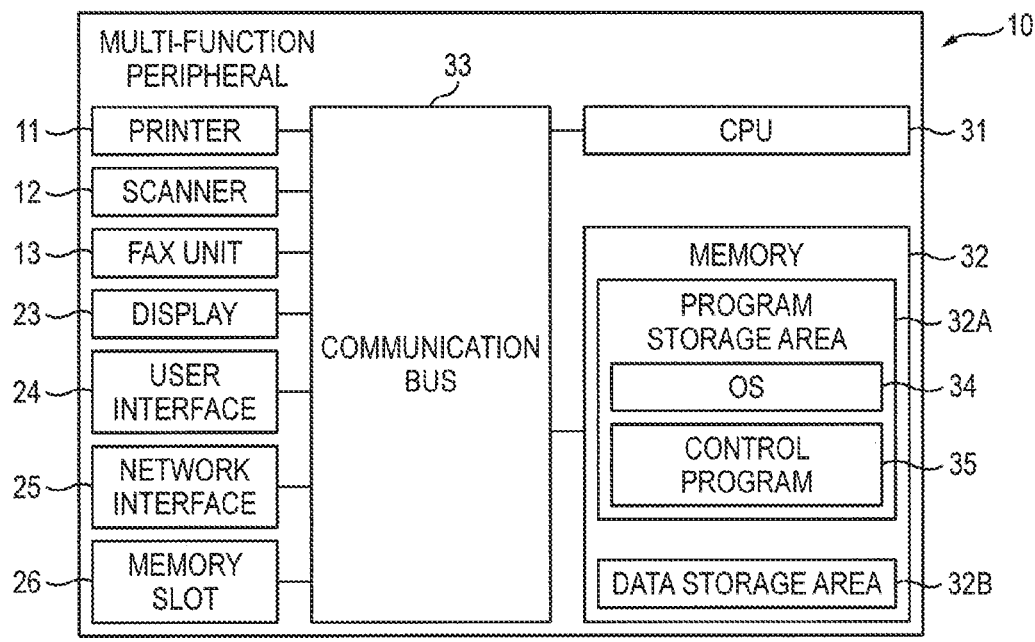
FIG. 2A is a block diagram of a MFP 10.

As shown in FIG. 2A, each MFP 10 mainly includes a printer 11, a scanner 12, a FAX unit 13, a display 23, a user interface 24, a network interface 25, a memory slot 26, a CPU 31, a memory 32, and a communication bus 33. Individual components constituting the MFP 10 are connected to one another via the communication bus 33. The MFPs 10 are examples of output devices.

The printer 11 performs a printing operation of recording images represented by image data on recording sheets. Recording sheets are examples of sheets or recording media. As the recording scheme of the printer 11, a known scheme such as an inkjet scheme or an electrophotographic scheme can be used. The scanner 12 performs a scanning operation of reading images recorded on documents, thereby generating image data. The FAX unit 13 performs a FAX transmitting operation and a FAX receiving operation of transmitting or receiving image data in a scheme based on a FAX protocol.

The printing operation and the FAX transmitting operation of the plurality of operations described above are examples of output operations of outputting contents represented by content data. Also, the printing operation is an example of a first operation, and the FAX transmitting operation is an example of a second operation. However, operations which is performed by the MFP 10 are not limited thereto. The MFP 10 may perform, an example of the output operations, a medium storage operation of storing content data, acquired from the portable terminal 50, in a portable storage medium mounted in the memory slot 26. The MFP 10 may perform, as another example of the output operations, an operation of controlling the display 23 to display images represented by image data acquired from the portable terminal 50.

Operations which is able to be performed by the MFPs 10A and 10B may be different. In the present embodiment, the MFP 10A is able to perform only the printing operation, and the MFP 10B is able to perform the printing operation and the FAX transmitting operation. Also, an output device is not limited to a device which is able to perform a plurality of operations, and may be able to perform only a single operation. In an MIB of each MFP 10, for example, a device ID identifying the corresponding MFP 10, and second operation IDs identifying operations which is able to be performed by the corresponding MFP 10 may be defined in advance. The device ID is an example of device identification information, and the second operation IDs are examples of second operation identification information. Hereinafter, a device ID and second operation IDs registered in an MIB will also be referred to as "device information".

The display 23 has a display screen for displaying a variety of information. An LCD, an OELD, or the like can be used as the display 23.

The user interface 24 receives user's operations for selecting objects displayed on the display screen of the display 23. Specifically, the user interface 24 has buttons, and outputs various operation signals associated with pushed buttons, to the CPU 31. Also, the user interface 24 may have a membranous touch sensor superimposed on the display screen of the display 23. That is, the display 23 may be configured as a touch panel display.

Meanwhile, the term "object" means an image which is selectable by operating the user interface 24 of the user. As an example, objects may be character strings displayed on the display 23, and when the user pushes direction keys of the user interface 24, one of the objects may be highlighted and then the user pushes a determination button of the user interface 24, the highlighted object may be selected. As another example, in a case where the user interface 24 is a touch panel, the objects may be icons, buttons, links, and the like displayed on the display 23, and an object displayed at a touched position may be selected.

The user interface 24 implemented as a touch panel receives user's operations touching the display screen of the display 23. Also, the user interface 24 outputs position information representing the touched positions on the display screen. As the upper left end of the display screen is the origin, and the right direction is the positive direction of the x axis, and the downward direction is the positive direction of the y axis, the position information can be expressed as coordinates (x, y) on an x-y plane. The touch panel can be used a known scheme such as an electrostatic capacitance scheme or a resistive film scheme.

Incidentally, in this specification, the term "touch" includes every operation by bringing inputting media into contact with the display screen. Touch examples are a tap operation by detaching a touched inputting medium from the display screen in a predetermined time, a long touch operation by stopping a touched inputting medium on the display screen, a slide operation by sliding a touched inputting medium on the display screen, a flick operation by sliding a touched inputting medium with acceleration equal to or higher than a threshold value, a pinch-in operation by sliding two inputting media touched at different locations on the display screen toward each other, a pinch-out operation by sliding two inputting media touched at different locations on the display screen away from each other, and the like.

Also, the term "touch" may include not only a case where an inputting medium is brought into contact with the display screen but also a case where an inputting medium is brought to a position close to the display screen. Further, the inputting media may be user's fingers, touch pens, etc. Hereinafter, an operation by taping the position of an icon displayed on the display 53 will be described as an example of an operation of selecting the corresponding icon.

The network interface 25 is an interface for performing communication with external devices via the communication network 101. That is, the MFP 10 outputs a variety of information to the portable terminal 50 via the network interface 25, and receives a variety of data or a variety of information from the portable terminal 50 via the network interface 25. A specific communication procedure of the network interface 25 is not limited. For example, Wi-Fi (a trademark of the Alliance) can be used. Also, the MFP 10 may have an installation interface such as a USB cable, instead of the network interface 25.

The memory slot 26 is an interface which a portable storage medium can be mounted to or removed from. The CPU 31 can read out data or information from a portable storage medium mounted to the memory slot 26, or write data or information in a portable storage medium mounted to the memory slot 26. Although specific examples of a portable storage medium are not limited, and the portable storage medium may be a USB memory, a SD card, a CD-ROM, and a DVD-ROM.

The CPU 31 controls the operation of the whole MFP 10. Based on a variety of information which is output from the user interface 24, a variety of information acquired from external devices via the network interface 25, and the like, the CPU 31 acquires various programs (to be described below) from the memory 32 and executes those programs. That is, the CPU 31 and the memory 32 constitute an example of a controller.

The memory 32 has a program storage area 32A and a data storage area 32B. The program storage area 32A stores an OS 34 and a control program 35. Also, the control program 35 may be a single program, or may be an aggregate of a plurality of programs. The data storage area 32B stores data or information necessary for executing the control program 35.

Also, in this specification, the term "data" and the term "information" represents a bit or a bit string which can be handled by a computer. That is, the two term are in common in that view. However, when the computer handles "data," it is unnecessary for the computer to recognize the meanings of individual bits. In contrast, when the computer handles "information," an operation of the computer is diverged according to the meanings of individual bits. Also, a term "instruction" represents a control signal for prompting a device being a transmission destination to perform a subsequent operation. An instruction may include "information" or may have characteristics as "information".

Further, even when "data" or the "information" is changed in format (for example, a text format, a binary format, a flag format, and so on) for each computer, as long as it can be recognized that the meaning of the changed data or information is identical to the meaning of the original data or information, the changed data or information are handled as data or information identical to the original data or information. For example, information indicating "two" may be saved in one computer as an ASCII code "0x32" which is text format information, and may be saved in another computer as a binary number "10" which is binary format information.

However, the term "data" and the term "information" are not strictly distinguished and are permitted to be exceptionally handled. For example, data may be temporarily handled as information, and information may be temporarily handled as data. Further, while one thing is handled as data in one device, the one thing may be handled as information in another device. Furthermore, information may be taken out from among data, or data may be taken out from among information.

The memory 32 may be configured, for example, by a RAM, a ROM, an EEPROM, an HDD, a buffer included in the CPU 31, or a combination of them.

Also, the memory 32 may be a computer-readable storage medium. The computer-readable storage medium is a non-transitory medium. The computer-readable storage medium is a non-transitory medium. Examples of the non-transitory medium include not only the above described examples but also other recording media such as a CD-ROM and a DVD-ROM. Also, the non-transitory medium is also a tangible medium. Meanwhile, an electric signal which carries a program which is downloaded from a server or the like on the Internet is a computer-readable signal medium which is one type of computer-readable medium, but is not non-transitory computer-readable storage media.

The programs stored in the program storage area 32A are executed by the CPU 31. However, in this specification, sometimes, the operation of each program will be described without mentioning the CPU 31. That is, in the following description, a description "a program "A" performs a processing "A"" may mean that "the CPU 31 performs the processing "A" described in the program "A"". This meaning is common to the portable terminal 50 to be described below.

Also, the programs stored in the program storage area 32A determine events and operate according to the determination results. However, in this specification, the operation of each program will be described without describing the determination processing. In other words, in the following description, a description "the control program performs a processing "A" according to a condition "A"" may mean that "the control program determines whether the condition "A" is satisfied, and when it is determined that the condition "A" is satisfied, the control program performs the processing "A"".

Also, the programs stored in the program storage area 32A specify, extract, or select data or the like. A processing of specifying data or the like is, for example, a processing of specifying a data item according to a condition from among a plurality of data items, and storing the specified data item or an information item identifying the specified data item in a predetermined storage area. Information identifying data or the like is, for example, identification information identifying the data or the like, the index of an array where the data or the like is stored, or the pointer of a storage area where the data or the like is stored. This meaning is common to processing of a program of, extracting, or selecting data or the like.

Also, the programs stored in the program storage area 32A acquire data and the like. A processing in which a program acquires data or the like may mean, for example, a processing of reading out data from a storage area where the data is stored. A processing in which a program acquires data or the like may mean, for example, a processing of receiving data from an external device. A processing in which a program acquires data or the like may mean, for example, a processing of requesting an external device to transmit data and receiving the data as a response from the external device. A processing in which a program acquires data or the like may mean, for example, a processing of receiving data from another program such as an OS. A processing in which a program acquires data or the like may mean, for example, a processing of requesting another program to output data and receiving data from another program.

An OS 34 is a basic program which provides an API for controlling the printer 11, the scanner 12, the FAX unit 13, the display 23, the user interface 24, the network interface 25, the memory slot 26, and so on which are hardware constituting the MFP 10. That is, each of the above described programs controls a corresponding piece of hardware by calling the API which is provided by the OS 34. However, in this specification, the operation of each program will be described without mentioning the OS 34. That is, in the following description, a description "a program "B" controls hardware "C"" may means that "the program "B" controls the hardware "C" via the API of the OS 34." This meaning is common to the portable terminal 50 to be described below.

Figure 2B:
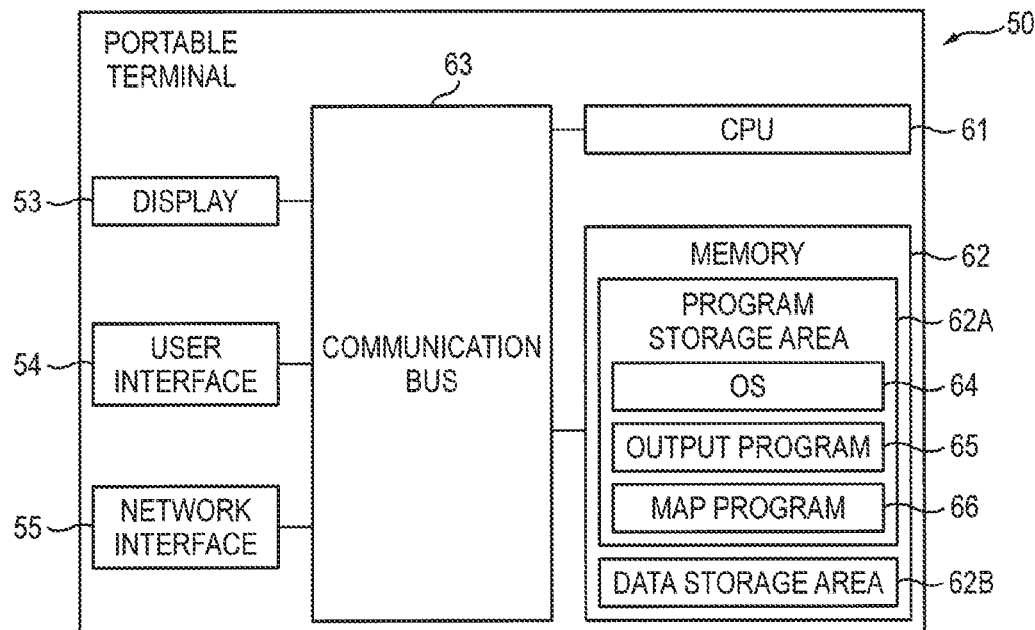
FIG. 2B is a block diagram of a portable terminal 50.
Figure 4B:
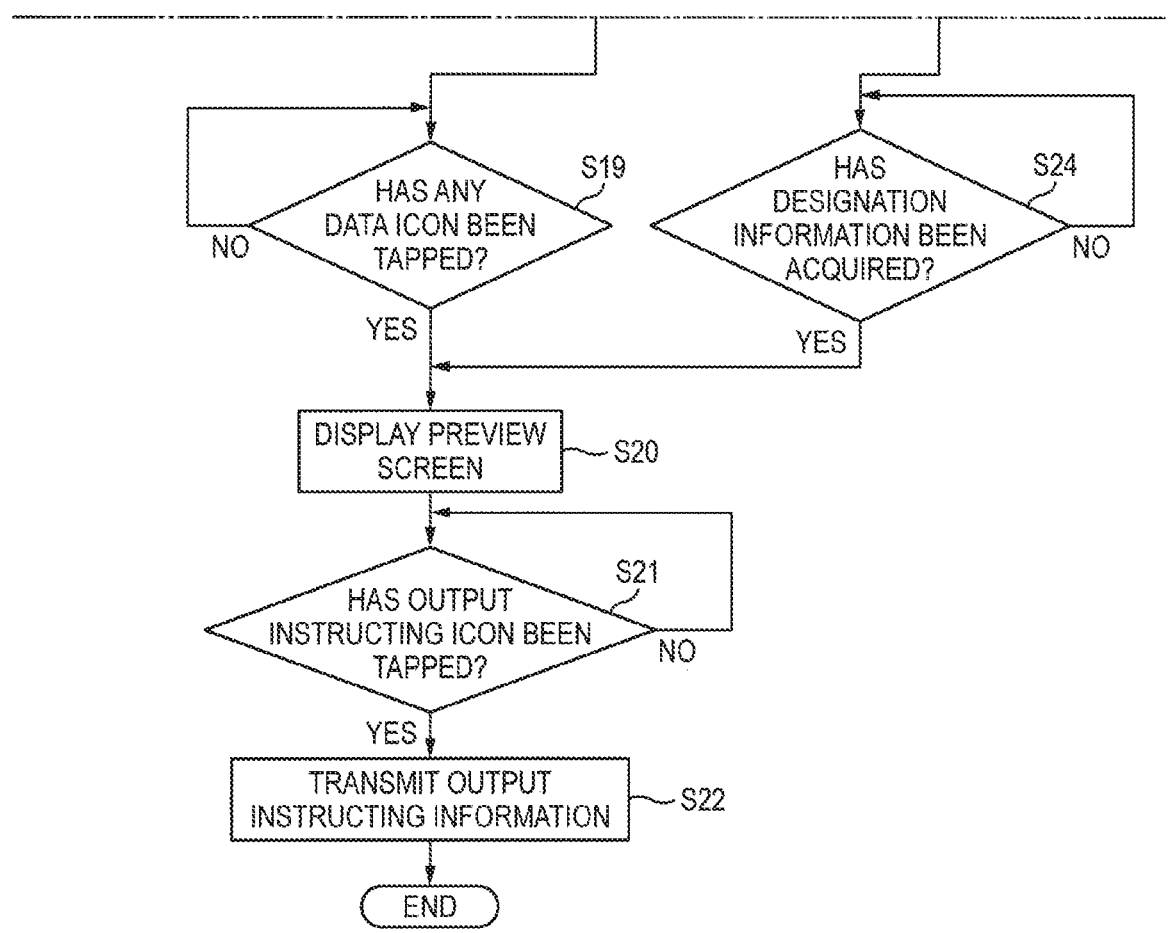

As shown in FIG. 2B, the portable terminal 50 mainly includes a display 53, a user interface 54, a network interface 55, a CPU 61, a memory 62, and a communication bus 63. The display 53, the user interface 54, the network interface 55, the CPU 61, the memory 62, and the communication bus 63 which are included in the portable terminal 50 are similar to the display 23, the user interface 24, the network interface 25, the CPU 31, the memory 32, and the communication bus 33 which are included in the MFP 10, and thus repetitive descriptions thereof will not be made. The CPU 61 and the memory 62 is an example of a controller. Examples of the portable terminal 50 is a smart phone, a portable phone, and a tablet terminal.

In the program storage area 62A of the memory 62, an OS 64, an output program 65 as an example of output instructions, a map program 66, and programs "A", "B", and "C" (not shown) as examples of external instructions are stored. Also, in the data storage area 62B of the memory 62, a variety of information shown in FIGS. 3A and 3B is stored. Further, in the data storage area 62B, a photo data folder for storing photo data may be provided. Photo data is an example of content data. However, the content data may be image data, video data, music data, or the like.

As shown in FIGS. 8A to 11A, the display 53 of the portable terminal 50 is divided into a common display area 80 and a program display area 81. In the common display area 80, regardless of the display content of the program display area 81, a status bar is displayed by the OS 64. In the status bar, a variety of information is displayed by the OS 64. In the status bar, for example, the title of a screen displayed on the program display area 81, an icon representing the remaining battery capacity of the portable terminal 50, an icon representing the communication state of the network interface 55, and an icon representing a push notification which the portable terminal 50 has received from an external service, and so on are displayed. In the program display area 81, a screen which is generated by a program which is executed in the foreground is displayed.

Hereinafter, a description "a program controls the display 53 to display a screen" means that a program screen is displayed in the program display area 81 and a status bar is displayed in the common display area 80. The program screen means a screen which is displayed in the program display area 81 in response to an instruction of the program. However, the display 53 may be switchable between a divided screen mode in which the display area is divided into the common display area 80 and the program display area 81, and a full screen mode in which the whole of the display area becomes the program display area 81.

Examples of the OS 64 include Android (a registered trademark of Google Inc.), iOS (a registered trademark of Cisco Systems, Inc.), Windows Phone (a registered trademark of Microsoft Corporation), and an operating system. The OS 64 can execute a plurality of programs installed in the portable terminal 50, in parallel. A plurality of programs can be virtually executed in parallel, for example, in a time division multiplex scheme. Also, when the OS 64 executes a plurality of programs in parallel, it executes one of them in the foreground, and executes the other programs in the background.

The foreground is, for example, a state where a program screen according to execution of the corresponding program is displayed on most of the display area of the display 53. Most of the display area may refer to, for example, the program display area 81. The background is, for example, a state where a program screen according to execution of a program different from the corresponding program is displayed in most of the display area of the display 53. In other words, when the portable terminal 50 executes a plurality of programs in parallel, the portable terminal can control display 53 to display only program screens according to execution of a program which is executed in the foreground.

The output program 65 is a program for making a MFP 10, connected via the network interface 55, perform an output operation of content data. The output program 65 transmits information, such as recording instructing information for making the multi-function peripheral perform the printing operation, or FAX instructing information for making the multi-function peripheral perform the FAX transmitting operation, to the MFP 10 via the network interface 55. The recording instructing information and the FAX instructing information are examples of output instructing information. Also, before transmitting the output instructing information, the output program 65 controls the display 53 to display a preview screen.

The map program 66 and the programs "A", "B", and "C" are examples of external programs. In this specification, the external programs are programs, which are separated from the output program 65 and can be independently executed, and which are different from the subroutines of the output program 65. For example, the external programs may operate as so-called plug-ins of the output program 65.

The map program 66 receives map image data from a map server (not shown), controls to display a map image based on the map image data, and makes the user select an arbitrary area of the displayed map image, and generates image data representing a map image of the selected area, and transfers the generated image data to the output program 65. Also, the map program 66 may receive user's operations of instructing editing of the map image of the selected area, and generate image data representing the map image edited according to the received user's operations, and transfer the generated image data to the output program 65. However, the output program 65 does not need to be able to receive map image data from the map server (not shown). Also, the output program 65 does not need to be able to edit map images.

The program "A" edits images according to user's operations, and transfer image data representing the edited images, to the output program 65. Also, the program "A" may be a so-called image editing program which makes the user select image data, and displays an image represented by the selected image data, and performs a type of editing which cannot be performed by the output program 65, on the displayed image, and generates image data representing the edited image, and transfers the generated image data to the output program 65. Examples of the type of editing which cannot be performed by the output program 65 include editing for converting an image to a stereoscopic image, editing for incorporating a frame image or a template image in an image, and editing for adding a stamp image or a mark image to an image.

The program "B" makes the user select operation conditions, such as scanning operation conditions like a read resolution, a read color mode (such as a color mode or a monochrome mode), and a file format (such as JPEG, TIFF, or PDF) for data to be generated, and transfers information representing the selected operation conditions (hereinafter, referred to as operation condition information) to the output program 65. Also, the program "B" may be a so-called a scan data processing program which generates operation condition information according to user's operations, and transfers the generated operation condition information to the output program 65, and receives scan data generated according to the operation condition information by a MFP 10, via the output program 65, and performs a predetermined processing which cannot be performed by the output program 65, on the scan data.

Examples of the predetermined processing which cannot be performed by the output program 65 include a processing of performing a type of editing which cannot be performed by the output program 65, on scan data, and a writing processing of writing write information which cannot be written by the output program 65, a saving processing of saving related information which cannot be associated with scan data by the output program 65, in association with the scan data, and a storing processing of storing scan data in an area in which the scan data cannot stored by the output program 65. Examples of the write information include tag data representing an event name, an event time, event participants, the user name of the program "B", and the like related to scan documents. Examples of the related information include files related to scan documents, and files in which tag data has been written. Examples of the storing processing include a processing of accessing an external server which cannot be accessed by the output program 65, and storing scan data in the external server.

The program "C" makes the user select a phone number specifying an external device as a FAX transmission destination, and transfers the selected phone number to the output program 65. Also, the program "C" may be a so-called FAX data generating program which generates FAX data which cannot be generated by the output program 65, according to user's operations, and makes the user select a phone number which cannot be selected by the output program 65, and transfers the generated image data and the selected phone number to the output program 65. Examples of the FAX data which cannot be generated by the output program 65 include color FAX data, FAX data of a size which cannot be generated by the output program 65, and FAX data in which the above described write information has been written. Examples of the phone number which cannot be selected by the output program 65 include a phone number received from an external server which cannot be accessed by the output program 65.

In other words, the external programs can be expressed as programs which complement some of the processing of the output program 65 necessary for making an output device perform an output operation. Also, the external programs may complement some of the processing of the output program 65 in a way different from that of the processing of the output program 65 or in the same way as that of the output program 65.

As an example, the map program 66 and the program "A" may perform some processing, such as a processing of receiving designation of content data to be a target of a printing operation, in stead of the output program 65. Also, examples of the processing of receiving designation of content data include a processing of receiving an image data selection instruction, and a processing of receiving an image edit instruction. As another example, the program "B" may perform some processing, a processing of receiving designation of operation conditions for a scanning operation, in stead of the output program 65. Also, examples of the processing of receiving designation of operation conditions for a scanning operation include a processing of receiving selection of operation conditions. As a further example, the program "C" may perform a processing of receiving designation of an output destination to which content data is to be output in a FAX transmitting operation, in stead of the output program 65. Also, examples of the processing of receiving designation of an output destination to which content data is to be output in a FAX transmitting operation include a processing of receiving selection of a phone number to be used as a FAX data destination.

As shown in FIG. 3A, the data storage area 62B stores program IDs, and first operation Ms and priority information associated with the program IDs. Hereinafter, the information shown in FIG. 3A will also be referred to collectively as a "program information list", and each record shown in FIG. 3A will also be referred to as a "program information record". In other words, the program information list can include a plurality of program information records. Also, the first operation IDs and the priority information will also be referred to as attribute information.

As an example, in a case where an external program is stored in the portable terminal 50, the output program 65 may receive a program information record including the program ID of the corresponding external program, from a server (not shown) via the network interface 55, and add the received program information record in the program information list. As another example, the output program 65 may acquire a program information record from an external program installed in the portable terminal 50, and add the acquired program information record in the program information list.

The program IDs are examples of program identification information identifying external programs. In the present embodiment, the map program 66 is identified by a program ID "001", and the program "A" is identified by a program ID "002", and the program "B" is identified by a program ID "003", and the program "C" is identified by a program ID "004".

A first operation ID is an example of first operation identification information identifying an output operation corresponding to an external program identified by a corresponding program ID. In other words, a first operation ID identifies an output operation which is able to be performed when an external program complements a processing. In the present embodiment, the first operation IDs of the map program 66 and the program "A" represent a printing operation, and the program "B" is not associated with any first operation ID, and the first operation ID of the program "C" represents a FAX transmitting operation. The first operation IDs are examples of information related to the contents of processing which the external programs make the portable terminal 50 perform. Also, a first operation ID and a second operation ID identifying the same operation have the same value. Hereinafter, the first operation Ms and second operation Ms will also be referred to collectively as operation IDs.

The priority information represents priorities of the external programs identified by corresponding program IDs. In the present embodiment, as a value represented by priority information is large, the priority is high, and as a value represented by priority information is small, the priority is low. The value of priority information may be fixed or variable. The output program 65 may increase the priority of an external program whenever the corresponding external program is activated in STEP S23 (to be described below). In other words, priority information may correspond to the number of times a corresponding external program is activated.

As shown in FIG. 3B, the data storage area 62B can store a device ID and a second operation ID associated with the corresponding device ID. Hereinafter, a record shown in FIG. 3B will also be referred to as a "device information record". Device IDs are examples of device identification information identifying the MFPs 10A and 10B. In the present embodiment, the device ID of the MFP 10A is "MFP-A", and the device ID of the MFP 10B is "MFP-B". A second operation ID identifies an output operation which is able to be performed by a MFP 10 which is identified by a corresponding device ID. An operation information record is not registered in advance when the output program 65 is installed, but is registered in a device selecting processing to be described below. In other words, a device information record includes a device ID and a second operation ID registered in a MIB of a MFP 10.

With reference to FIGS. 4 to 11B, the operation of the recording system 100 according to the present embodiment will be described. The recording system 100 receives user's operations of designating content data, an output operation of outputting the content data, and an output device to perform the output operation, by the portable terminal 50, and makes the designated output device perform the designated output operation of the designated content data. Hereinafter, content data designated by the user will be referred to as "designation data", and an output operation designated by the user will be referred to as a "designation operation", and an output device designated by the user will be referred to as a "designation device".

First, the OS 64 of the portable terminal 50 displays a menu screen in the program display area 81 and displays a status bar in the common display area 80. FIG. 8A shows an example of the menu screen. A menu screen shown in FIG. 8A includes a plurality of program icons 111, 112, 113, 114, and 115. The program icons 111 to 115 correspond to programs installed in the portable terminal 50. For example, the program icon 111 corresponds to the output program 65, and the program icon 112 corresponds to the map program 66, and the program icon 113 corresponds to the program "A", and the program icon 114 corresponds to the program "B", and the program icon 115 corresponds to the program "C".

In this case, the OS 64 receives selection of any one of the program icons 111 to 115 via the user interface 54. When the OS 64 receives selection of one of the program icons 111 to 115 via the user interface 54, the OS 64 activates a program corresponding to the selected program icon and performs the activated program in the foreground. Hereinafter, a processing in a case where the program icon 111 is selected will be described.

Figure 5:
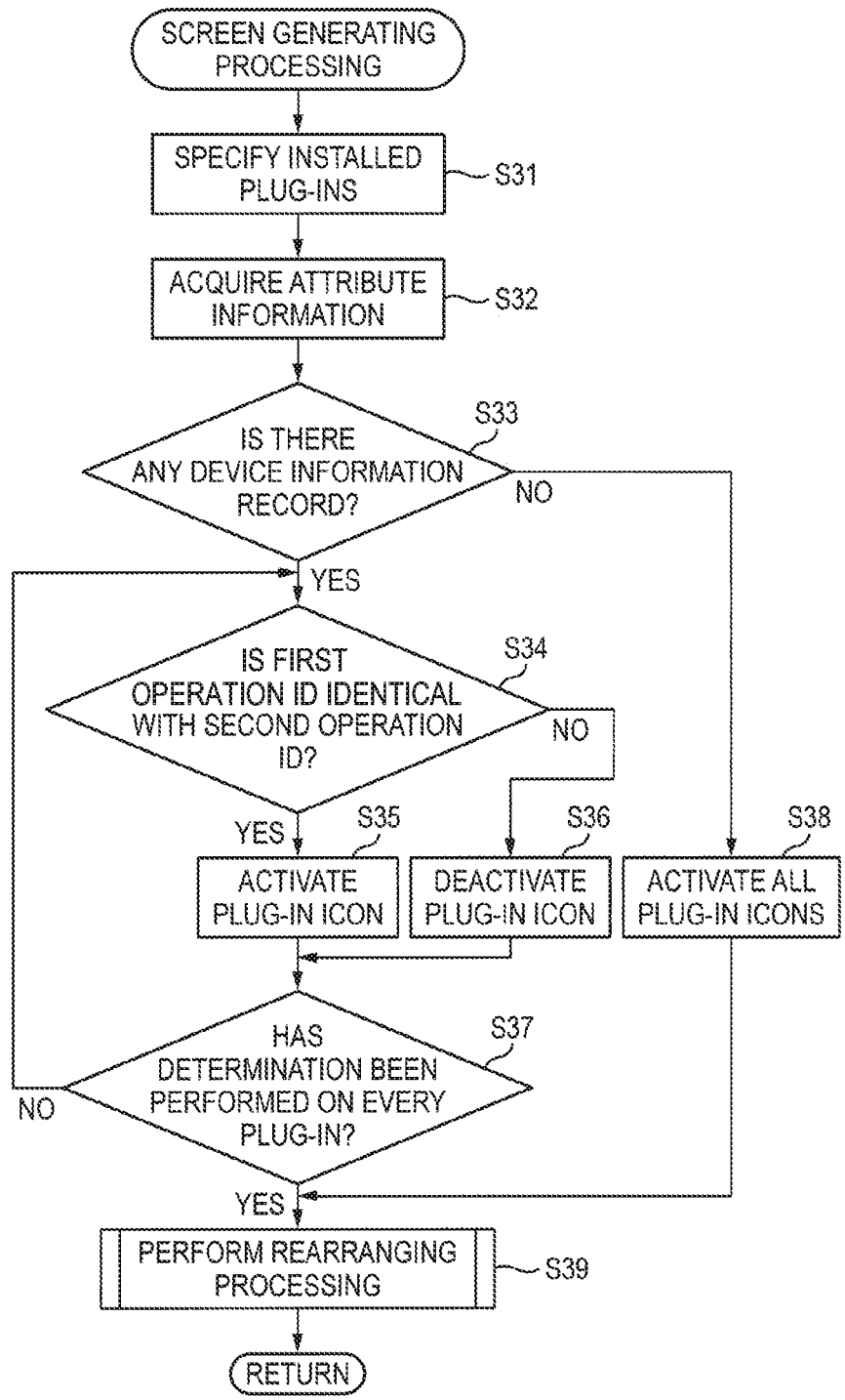
FIG. 5 is a flow chart of a screen generating processing.
Figure 8B:
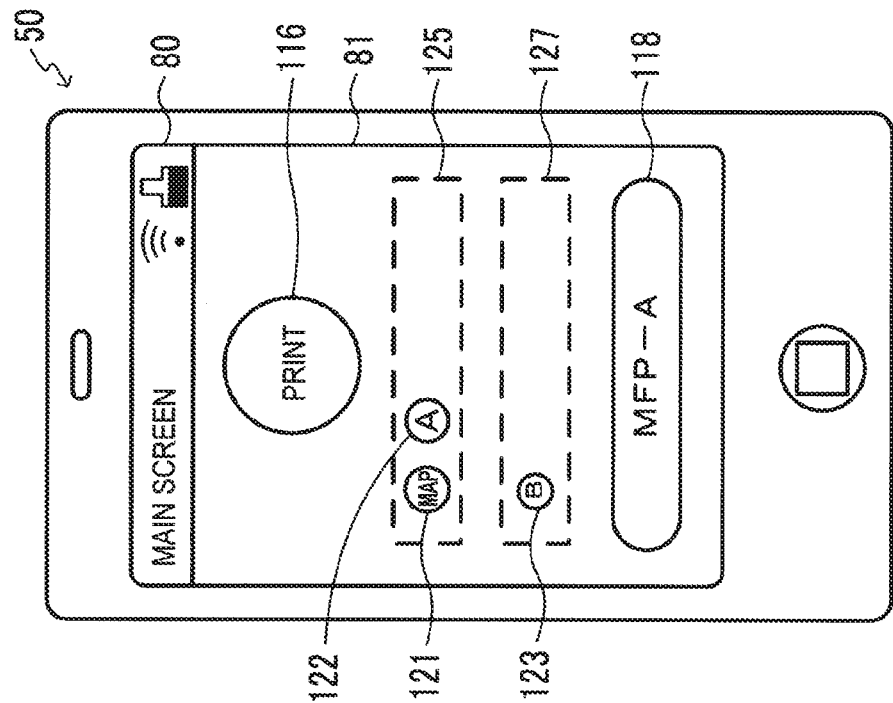
Figure 8A:
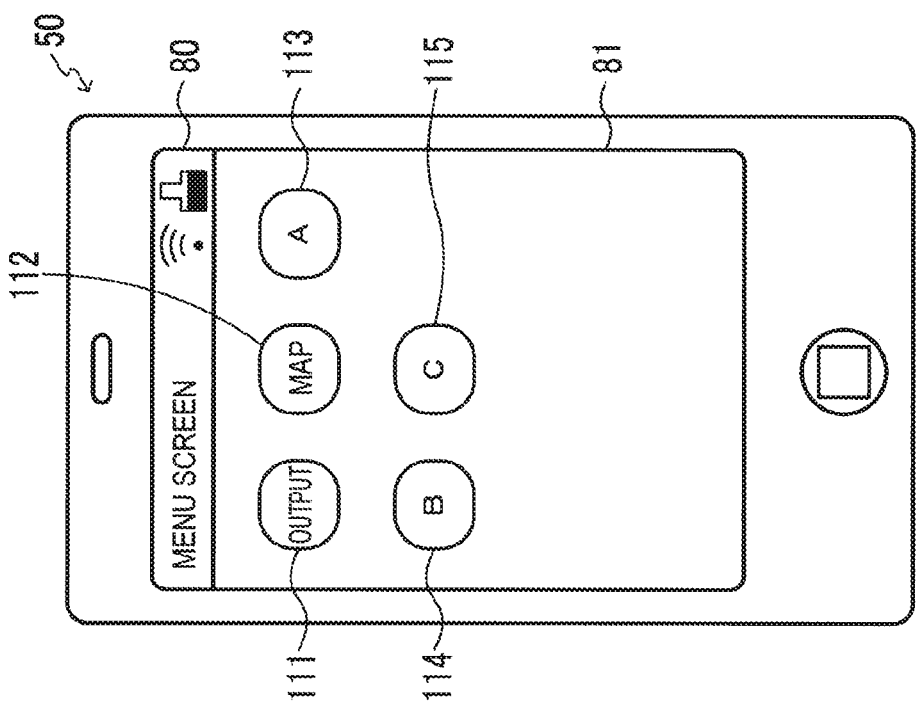

When the output program 65 of the portable terminal 50 is activated by the OS 64, in STEP S11, the output program performs a screen generating processing of generating a main screen shown in FIG. 8B. The screen generating processing is a processing of generating a screen to be displayed on the display 53, wherein the screen generating processing is a processing of determining a plug-in icon display mode to be described below. With reference to FIG. 5, details of the screen generating processing will be described.

First, in STEP S31, the output program 65 specifies the external programs stored in the program storage area 62A, that is, installed in the portable terminal 50. Subsequently, in STEP S32, the output program 65 reads out attribute information of the external programs specified in STEP S31. The processing of STEP S31 is an example of a first specifying processing, and the processing of STEP S32 is an example of an attribute information acquiring processing. Also, a program information record corresponding to the program ID "003" does not include any first operation ID. For this reason, the output program 65 cannot read a first operation ID corresponding to the program ID "003" in STEP S32. In a case where the output program 65 cannot read out a first operation ID corresponding to a program ID, the output program temporarily stores status information representing that any first operation ID has not associated with the corresponding program ID, in the data storage area 62B.

Specifically, the output program 65 reads out the program information list shown in FIG. 3A from the data storage area 62B. Thereafter, in STEP S31, the output program 65 specifies the external programs identified by the program IDs included in the read program information list, as external programs installed in the portable terminal 50. Subsequently, in STEP S32, the output program 65 acquires the attribute information included in the read program information list.

Subsequently, in STEP S33, the output program 65 determines whether any device information record is stored in the data storage area 62B. When it is determined that a device information record is stored in the data storage area 62B ("Yes" in STEP S33), in STEP S34, the output program 65 compares each first operation ID included in the attribute information acquired in STEP S32, with a second operation ID included in the corresponding device information record. Also, in case where a plurality of program information records has been registered in the program information list, the output program 65 performs the processing of STEPS S34 to S36 on each of the plurality of program information records (STEP S37). The processing of STEP S33 is an example of a second determining processing, and the processing of STEP S34 is an example of a first determining processing.

When it is determined that the first operation ID "PRINT OPERATION" corresponding to the program ID "001" is identical with the second operation ID "PRINT OPERATION" ("Yes" in STEP S34), in STEP S35, the output program 65 activates a plug-in icon 121 (see FIG. 8B) corresponding to the program ID "001". Similarly, the output program activates a plug-in icon 122 (see FIG. 8B) corresponding to the program ID "002". Meanwhile, when it is determined that the first operation ID "FAX TRANSMITTING OPERATION" corresponding to the program ID "004" is not identical with the second operation ID "PRINT OPERATION" ("No" in STEP S34), in STEP S36, the output program 65 deactivates a plug-in icon 124 (see FIG. 9B) corresponding to the program ID "004". Further, although not shown, the output program 65 determines whether there is any program ID which has not been associated with any first operation ID, with reference to the status information stored in the data storage area 62B. When it is determined that there is a program ID associated with a first operation ID, the output program 65 activates the plug-in icon of the corresponding program ID. In the present embodiment, a plug-in icon 123 (see FIG. 8B) of the program ID "003" is activated.

Meanwhile, when it is determined that any device information record is not stored in the data storage area 62B ("No" in STEP S33), in STEP S38, the output program 65 activates all of the plug-in icons 121 to 124 of the external programs specified in STEP S31. Also, "activation of an icon" means a display mode in which the corresponding icon can be selected via the user interface 54. Meanwhile, "deactivation of an icon" means a display mode in which the corresponding icon cannot be selected via the user interface 54. In the present embodiment, active icons are displayed in screens, and inactive icons are not displayed in screens.

Figure 6:
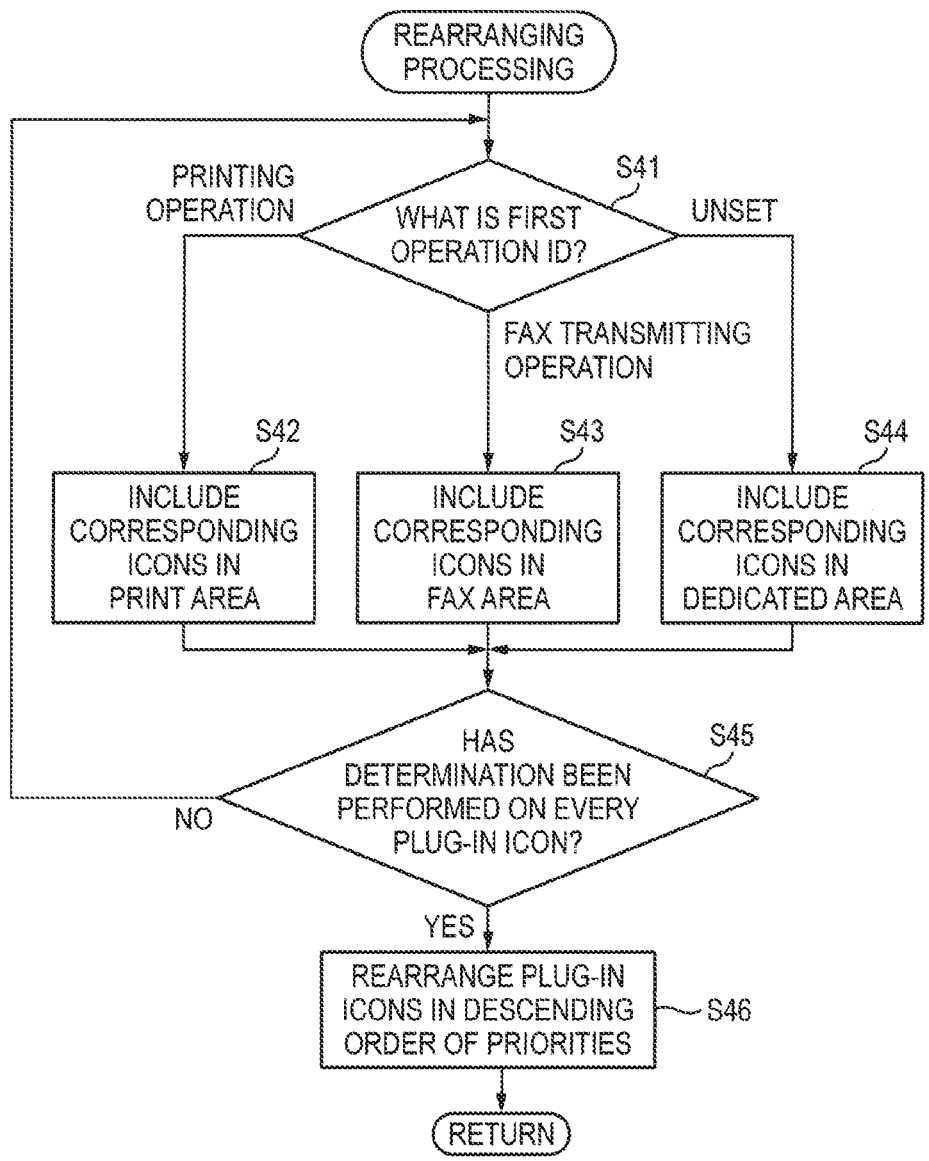
FIG. 6 is a flow chart of a rearranging processing.

Subsequently, in STEP S39, the output program 65 performs a rearranging processing. STEPS S35 to S39 represent an example of a deciding processing. The rearranging processing is a processing of determining the layout and arrangement order of the plug-in icons 121 to 123 which are activated. With reference to FIG. 6, details of the rearranging processing will be described.

First, in STEP S41, the output program 65 confirms the first operation IDs corresponding to the plug-in icons 121 to 123. In a case where the number of the plug-in icons 121 to 123 to be displayed on a screen is two or more, the output program 65 performs the processing of STEPS S41 to S44 on each of the plurality of plug-in icons 121 to 123 (STEP S45). However, it is unnecessary to perform the processing of STEPS S41 to S44 on the plug-in icon 124 which is not included in the screen.

Then, when the first operation ID represents "PRINT OPERATION" ("PRINT OPERATION" in STEP S41), in STEP S42, the output program 65 includes corresponding plug-in icons 121 and 122 in a print icon area 125 (see FIG. 8B). Meanwhile, when the first operation ID represents "FAX TRANSMITTING OPERATION" ("FAX TRANSMITTING OPERATION" in STEP S41), in STEP S43, the output program 65 includes corresponding plug-in icons in a FAX icon area 126 (see FIG. 9B) to be described below. Also, when there is not any associated first operation ("UNSET" in STEP S42), in STEP S44, the output program 65 includes the corresponding plug-in icon 123 in a dedicated icon area 127 (see FIG. 8B) to be described below. The print icon area 125 is an example of a first display area, and the FAX icon area 126 is an example of a second display area, and the dedicated icon area 127 is an example of a third display area.

Subsequently, in STEP S46, the output program 65 determines the arrangement order of the plug-in icons 121 to 123, based on the priority information. Specifically, the output program 65 sets the arrangement order of the plurality of plug-in icons 121 to 123 to the descending order of priorities represented by the corresponding priority information. Also, with respect to each of the icon areas 125, 126, and 127, the output program 65 determines the arrangement order of plug-in icons to be included in the corresponding display area.

As an example, in a case where the plurality of plug-in icons is arranged in an up-down direction, plug-in icons having high priorities are disposed on the upper side, and plug-in icons having low priorities are disposed on the lower side. As another example, in a case where the plurality of plug-in icons is arranged in a left-right direction, plug-in icons having high priorities are disposed on the left side, and plug-in icons having low priorities are disposed on the right side. However, the arrangement order of the plug-in icons is not limited thereto.

Referring to FIG. 4A again, in STEP S12, the output program 65 controls the display 53 to display the main screen shown in FIG. 8B. The main screen shown in FIG. 8B includes an operation icon 116, a device icon 118, and the plug-in icons 121, 122, and 123, but does not include the plug-in icon 124. The processing of STEP S12 is an example of a display control processing. The main screen is an example of a selection screen or an operation selection screen.

The operation icon 116 is an example of an operation designation object or a first object corresponding to an output operation which is able to be performed by the designation device. The device icon 118 is an example of a device designation object corresponding to a processing of designating the designation device. On the device icon 118, the device ID "MFP-A" identifying the MFP 10A, which is a designation device at that moment, is indicated. Also, in the main screen which is displayed during activation of the output program 65, the device icon 118 represents that the MFP 10A identified by the device ID "MFP-A" included in the device information record has been designated as the designation device. Also, the operation icon 116 corresponds to the printing operation identified by the second operation ID included in the device information record. Meanwhile, in a case where any device information record has not been registered, on the device icon 119, a character string such as "UNSELECTED" may be displayed, and any operation icon may not be displayed.

The plug-in icons 121 to 123 are examples of program objects corresponding to the external programs. In the main screen, the active plug-in icons 121 to 123 are displayed in a mode determined in the screen generating processing. In other words, the plug-in icons 121 and 122 are disposed in the print icon area 125 adjacent to the operation icon 116. Also, in the print icon area 125, the plug-in icon 121 is disposed on the left side from the plug-in icon 122. Further, the plug-in icon 123 is disposed in the dedicated icon area 127 which is different from the print icon area 125 and is farther from the operation icon 116 than the print icon area 125 is. Also, as shown in the example of FIG. 8B, the plug-in icon 123 which is disposed in the dedicated icon area 127, that is, the plug-in icon 123 which has not been associated with any output operation may be displayed smaller than the other plug-in icons 121 and 122.

Figure 7:
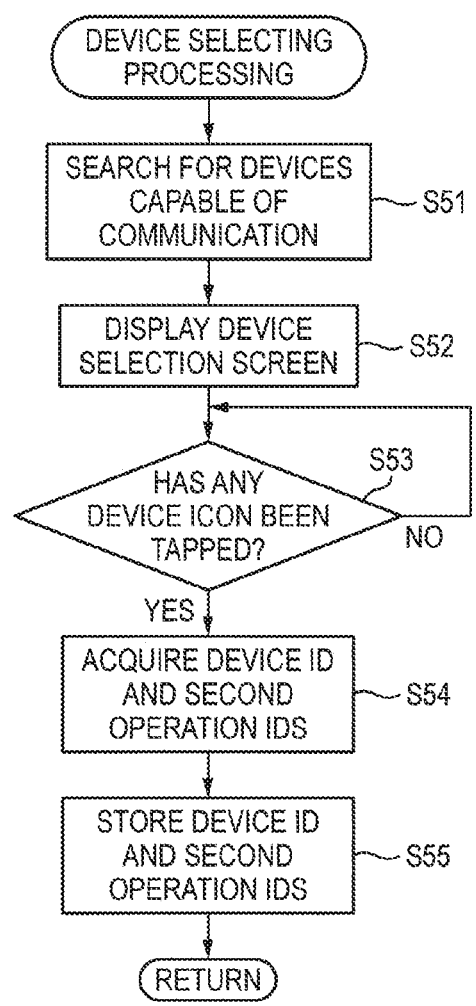
FIG. 7 is a flow chart of a device selecting processing.

Subsequently, in STEP S13, the output program 65 receives selection of any one of the various icons included in the main menu, via the user interface 54. The processing of STEP S13 is an example of a first receiving processing. When the output program 65 receives selection of the position of the device icon 118 via the user interface 54 ("DEVICE ICON" in STEP S13), in STEP S14, the output program 65 performs a device selecting processing. The device selecting processing is a processing of making the user select a designation device. With reference to FIG. 7, details of the device selecting processing will be described.

First, in STEP S51, the output program 65 searches for a plurality of MFPs 10 being able to perform communication via the network interface 55. The processing of STEP S51 is an example of a second specifying processing. Subsequently, in STEP S52, the output program 65 controls the display 53 to display a device selection screen. FIG. 9A shows an example of the device selection screen. A device selection screen shown in FIG. 9A includes device icons 131 and 132. The device icons 131 and 132 correspond to the MFPs 10A and 10B searched in STEP S51. Also, on the device icons 131 and 132, there are written the device IDs of the corresponding MFPs 10A and 10B.

Subsequently, in STEP S53, the output program 65 receives selection of an icon included in the device selection screen, via the user interface 54. For example, when the output program 65 receives selection of the device icon 132 via the user interface 54 ("Yes" in STEP S53), in STEP S54, the output program acquires the device information of the MFP 10B corresponding to the device icon 132. Here, the device ID "MFP-B", and two second operation IDs representing "PRINT OPERATION" and "FAX TRANSMITTING OPERATION" are acquired. The processing of STEP S53 is an example of a second receiving processing, and the processing of STEP S54 is an example of a device information acquiring processing.

For example, in STEP S54, the output program 65 acquires device information stored in the MIB, by using SNMP. Specifically, the output program 65 transmits a device information transmission request to the MFP 10 via the network interface 55. Subsequently, the output program 65 receives the device information as a response from the MFP 10 via the network interface 55. Also, the information registered in the MIB of the MFP 10 may be model information representing the model of the MFP 10. In this case, the output program 65 accesses to correspondence information between model information and second operation IDs corresponding to the model information, and acquires the second operation IDs corresponding to the received model information. In other words, the correspondence information may information representing operations which is able to be performed by the MFP 10 of the model represented by the model information. Also, the correspondence information may be stored in the portable terminal 50 in advance, or may be stored in a cloud server (not shown) in advance.

Subsequently, in STEP S55, the output program 65 stores a device information record including the device ID "MFP-B" and the second operation IDs "PRINT OPERATION" and "FAX TRANSMITTING OPERATION" corresponding to the selected device icon 132 (hereinafter, referred to as a "new device information record") in the data storage area 62B. The processing of STEP S55 is an example of storage control processing. Also, in a case where any operation information record is not stored in the data storage area 62B, the output program 65 newly stores the new operation information record in the data storage area 62B. Meanwhile, in a case where an operation information record (hereinafter, referred to as an old operation information record) is stored in the data storage area 62B, the output program 65 overwrites the old operation information record with the new operation information record Referring to FIG. 4A again, the output program 65 generates the main screen shown in FIG. 9B (in STEP S11) and controls the display 53 to display the main screen shown in FIG. 9B (in STEP S12). In other words, after the device selecting processing of STEP S14, the output program 65 performs the screen generating processing of STEP S11 and the display control processing of STEP S12. The screen generating processing being performed here is different from the above described processing, in that "FAX TRANSMITTING OPERATION" has been added as a second operation ID as compared in STEP S34. Hereinafter, descriptions of the processing shown in FIGS. 5 and 6 identical to those of the above described processing will be omitted, and the differences therebetween will be mainly described.

First, the output program 65 determines that the first operation ID "FAX TRANSMITTING OPERATION" corresponding to the program ID "004" is identical with the second operation ID "FAX TRANSMITTING OPERA-TION" ("Yes" in STEP S34), and activates the plug-in icon 124 corresponding to the program ID "004", in STEP S35. In other words, in a case where there is a plurality of second operation IDs, in STEP S34, the output program determines whether each of the plurality of second operation IDs is identical with the first operation ID. Also, when the first operation ID corresponding to the plug-in icon 124 represents "FAX TRANSMITTING OPERATION" ("FAX TRANSMITTING OPERATION" in STEP S41), the output program 65 includes the plug-in icon 124 in the FAX icon area 126 in STEP S43.

Figure 9B:
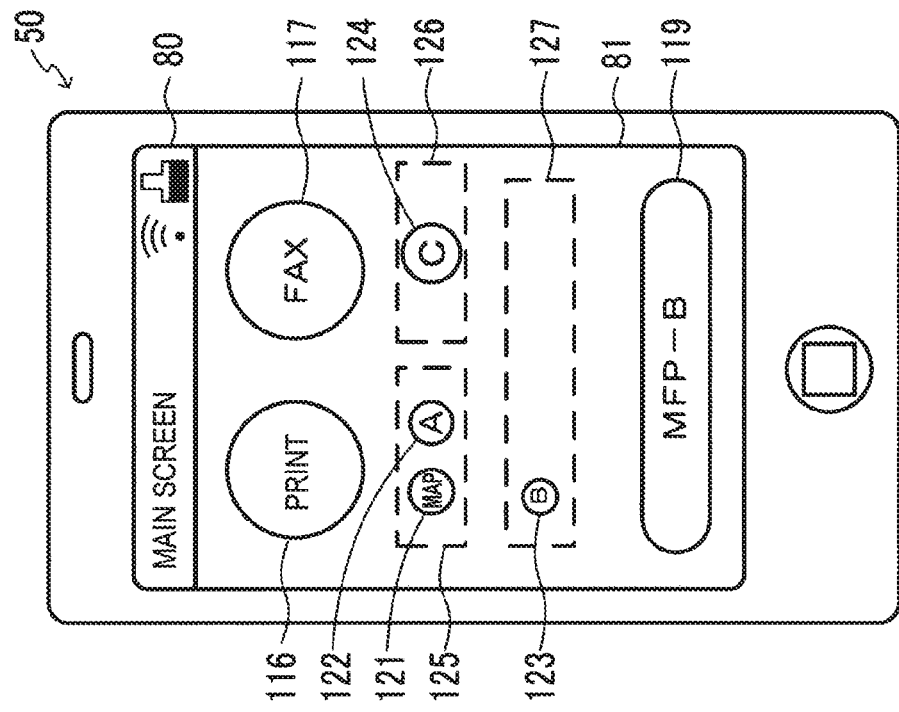
FIGS. 9A and 9B show display examples of the display 53, wherein 9A shows a device selection screen.
Figure 9A:
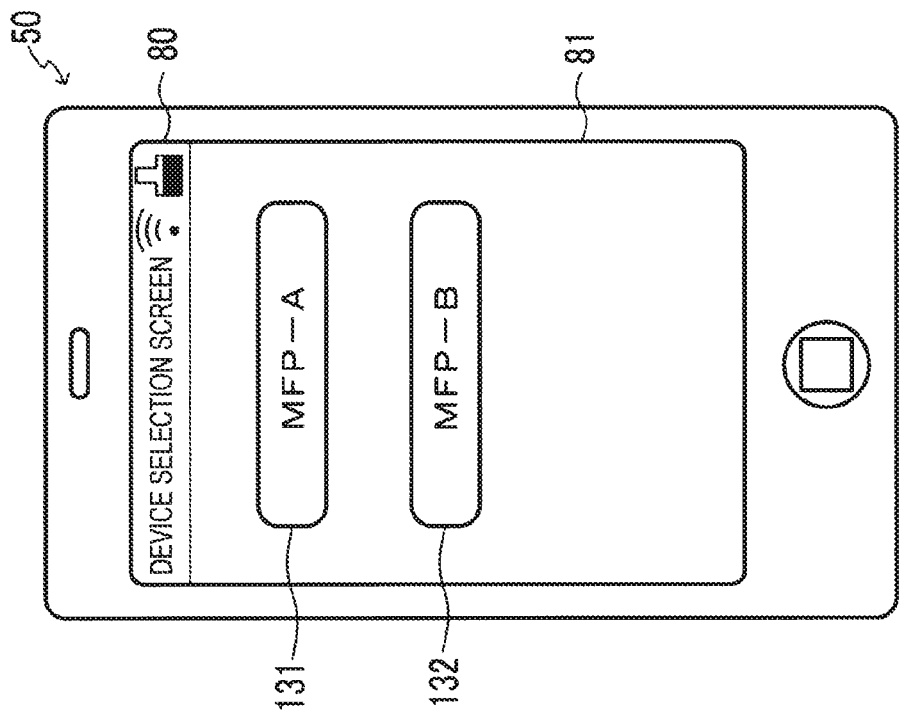

The main menu shown in FIG. 9B is different from the main menu shown in FIG. 9A, in that the operation icon 117 and the plug-in icon 124 are further displayed, and the device icon 119 is displayed in stead of the device icon 118. The operation icon 117 is an example of an operation designation object or a second object corresponding to the FAX transmitting operation. When the MFP 10B capable of the FAX transmitting operation is selected on the device selection screen, the operation icon 117 is newly included in the main screen. The plug-in icon 124 is disposed in the FAX icon area 126 adjacent to the operation icon 117 corresponding to the FAX transmitting operation. Also, since the FAX icon area 126 is newly provided, the width of the print icon area 125 narrows. Further, the device icon 119 represents that the MFP 10B identified by the device ID "MFP-B" included in the device information record has been designated as a designation device.

Also, in the main screen shown in FIG. 9B, the plug-in icon 124 is larger than the plug-in icons 121 to 123. In other words, in the screen generating processing, the output program 65 makes the size of the plug-in icon 124, which is not displayed in the main screen shown in FIG. 8B but is displayed in the main screen shown in FIG. 9B, larger than the plug-in icons 121 to 123 which are displayed in both of the main screens shown in FIGS. 8B and 9B.

In other words, the output program 65 makes the display mode of the plug-in icon 124, which is determined so as not to be included in the selection screen in the screen generating processing immediately before performance of STEP S55 and determined so as to be included in the screen in the screen generating processing immediately after performance of STEP S55, different from the other plug-in icons 121 to 123. Also, the method of making the display mode of the plug-in icon 124 different from the other icons is not limited to the above described example. For example, the plug-in icon 124 may be surrounded by a frame, or an image representing that the plug-in icon 124 is a newly displayed icon may be added.

Subsequently, when the output program 65 receives selection of one of the operation icons 116 and 117 via the user interface 54 ("OPERATION ICON" in STEP S13), it temporarily stores the operation ID of the output operation corresponding to the selected the operation icon 116 or 117, and the device ID written on the device icon 119, in the data storage area 62B. The temporarily stored operation ID is a designation operation ID identifying the designation operation. The temporarily stored device ID is a designation device ID identifying the designation device.

In the present embodiment, on the assumption that the operation ID of the printing operation has been temporarily stored as the designation operation ID, and the device ID "MFP-B" has been temporarily stored as the designation device ID, the following description will be continued. Also, the processing of STEPS S15 to S22 represent an example of a processing in a case where the printing operation is designated as a designation operation. In other words, in a case where any other output operation is designated as a designation operation, processing different from STEPS S15 to S22 may be performed.

Figure 10A:
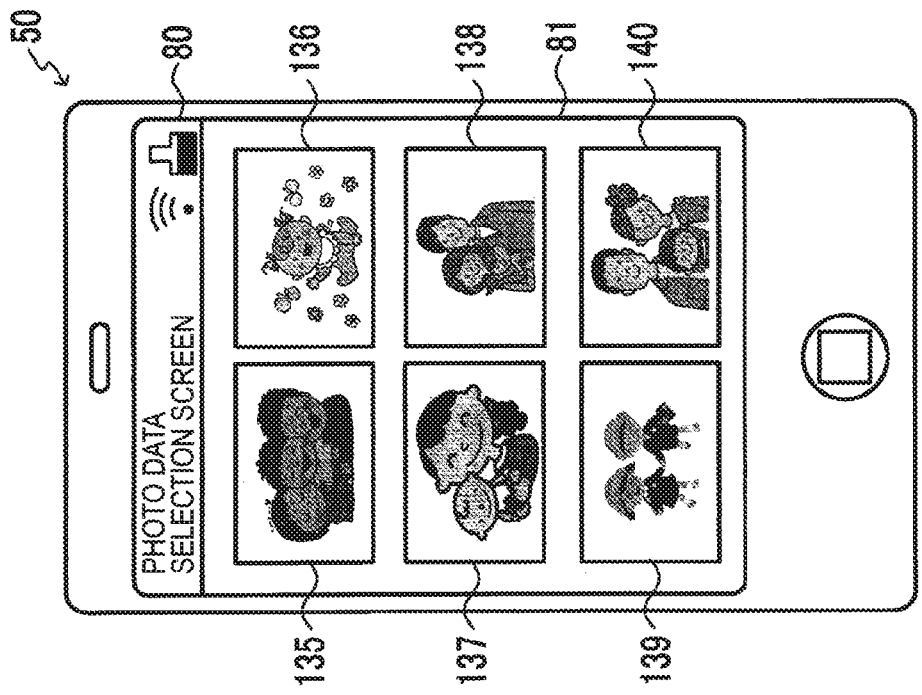

Subsequently, in STEP S15, the output program 65 performs a screen generating processing of generating a data acquisition source selection screen. The processing content of the screen generating processing is common to STEPS S11 and S15. Subsequently, in STEP S16, the output program 65 controls the display 53 to display the data acquisition source selection screen generated in STEP S15. The processing of STEP S16 is an example of a display control processing. FIG. 10A shows an example of the data acquisition source selection screen.

The data acquisition source selection screen is an example of a selection screen or a first program selection screen which is displayed when the operation icon 116 is selected. The data acquisition source selection screen is a screen for making the user select an acquisition source of designation data to be used in the printing operation. The data acquisition source selection screen shown in FIG. 10A includes acquisition source icons 133 and 134, and the plug-in icons 121 and 122. The acquisition source icon 133 corresponds to a photo data folder of the data storage area 62B which is a photo data acquisition source. The acquisition source icon 134 corresponds to a server (not shown) on the Internet.

Also the data acquisition source selection screen includes only the print icon area 125, corresponding to the printing operation which is the designation operation, of the icon areas 125, 126, and 127, and does not include the FAX icon area 126 and the dedicated icon area 127. In other words, the data acquisition source selection screen includes only the plug-in icons 121 and 122, which are disposed in the print icon area 125, of the plug-in icons 121 to 124, and does not include the plug-in icons 123 and 124 which are disposed in the FAX icon area 126 and the dedicated icon area 127. Also, in the print icon area 125, the plug-in icon 121 is disposed on the upper side from the plug-in icon 122.

Subsequently, in STEP S17, the output program 65 receives selection of an icon included in the data acquisition source selection screen, via the user interface 54. The processing of STEP S17 is an example of a first receiving processing. For example, when the output program 65 receives selection of the acquisition source icon 133 via the user interface 54 ("ACQUISITION SOURCE ICON" in STEP S17), in STEP S18, the output program controls the display 53 to display a photo data selection screen. Subsequently, in STEP S19, the output program 65 receives selection of an icon included in the photo data selection screen via the user interface 54.

Figure 10B:
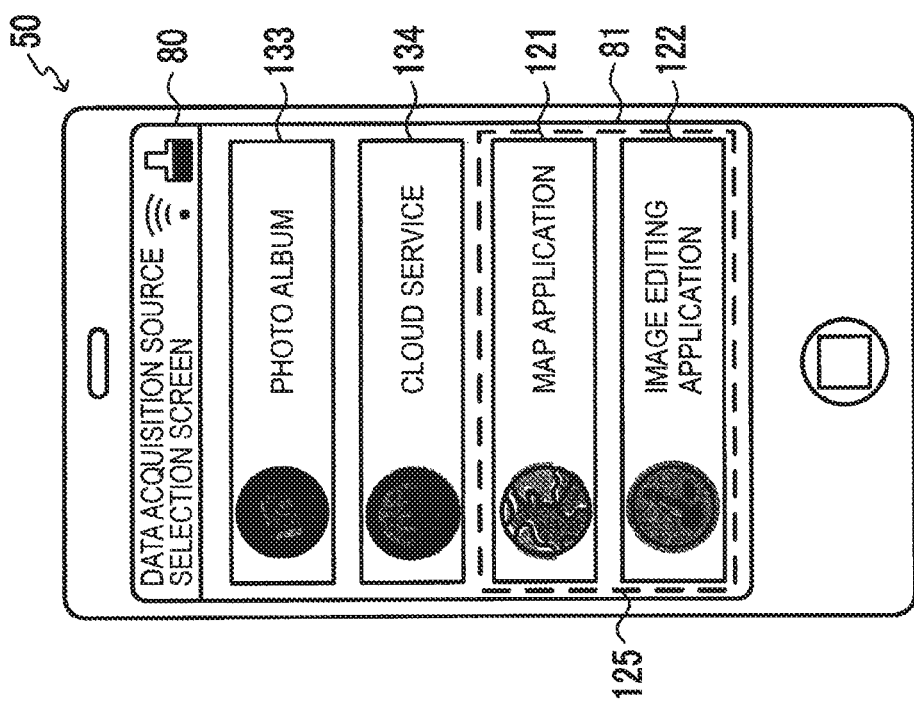

FIG. 10B shows an example of the photo data selection screen. A photo data selection screen shown in FIG. 10B includes a plurality of data icons 135, 136, 137, 138, 139, and 140. The data icons 135 to 140 are examples of data designation objects corresponding to content data which can be designated as designation data. The data icons 135 to 140 correspond to photo data stored in the photo data folder of the data storage area 62B. Meanwhile, in a case where the acquisition source icon 134 is selected, in STEP S18, the output program 65 controls the display 53 to display a data selection screen including a data icon corresponding to content data stored in a server on the Internet.

Subsequently, when the output program 65 receives selection of one of the data icons 135 to 140 via the user interface 54 ("Yes" in STEP S19), the output program temporarily stores content data corresponding to the selected data icon, as designation data, in the data storage area 62B. Alternatively, the output program 65 may temporarily store information specifying the designation data (hereinafter, referred to as a "designation data ID"), not the designation data, in the data storage area 62B. The designation data ID may be, for example, information indicating the storage location of the designation data, or may be a URL indicating the designation data. In the present embodiment, on the assumption that the data icon 135 is selected, the following description will be continued.

Figure 11A:
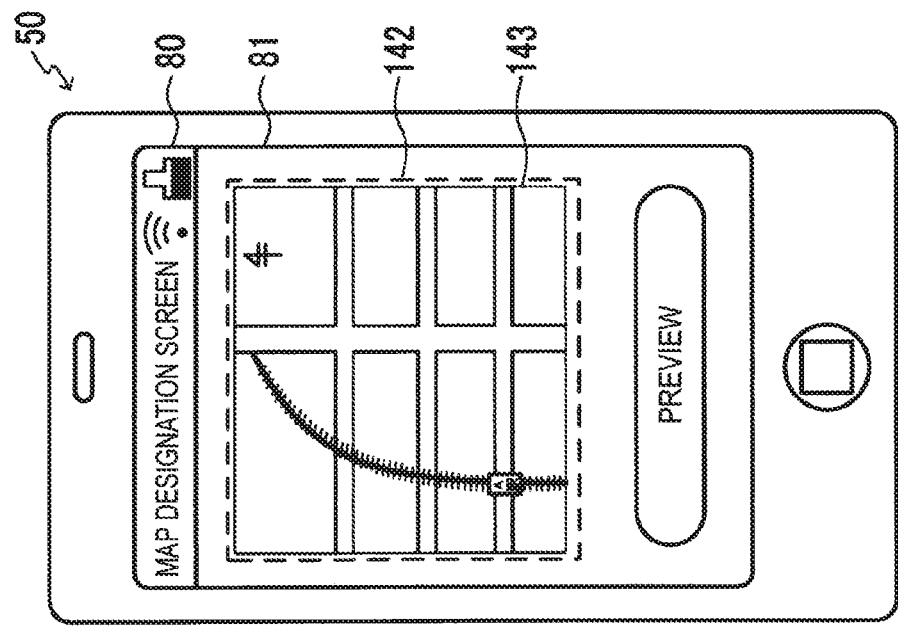

Subsequently, in STEP S20, the output program 65 controls the display 53 to display a preview screen. FIG. 11A shows an example of the preview screen. A preview screen shown in FIG. 11A includes a preview image 141 and a "PRINT" icon. The preview image 141 is an image which will be obtained by outputting the designation data designated in STEP S19 by the designation operation designated in STEP S13. In other words, the preview image 141 represents a image which will be obtained by recording a photo, represented by the photo data corresponding to the data icon 135, on a recording sheet. The "PRINT" icon is an example of an output instructing icon corresponding to an instruction for making the designation device perform the printing operation.

Subsequently, in STEP S21, the output program 65 receives selection of an icon included in the preview screen, via the user interface 54. When the output program 65 receives selection of the "PRINT" icon via the user interface 54 ("Yes" in STEP S21), in STEP S22, the output program transmits print instructing information to the MFP 10B via the network interface 55. The processing of STEP S22 is an example of an output instructing processing.

The print instructing information is an example of output instructing information for making the designation device perform the printing operation of the designation data. The print instructing information of the present embodiment includes the photo data corresponding to the data icon 135, and the designation operation ID of the printing operation. In this case, the output program 65 transmits the corresponding print instructing information to the MFP 10B which is the designation device, via the network interface 55. Also, the print instructing information may include a designation data ID such as a URL, not the designation data.

Meanwhile, although not shown, the control program 35 of the MFP 10B receives the print instructing information from the portable terminal 50 via the network interface 25. Then, the control program 35 controls the printer 11 to perform the printing operation according to the received print instructing information. In other words, the printer 11 records the photo represented by the photo data included in the print instructing information, on a recording sheet.

Meanwhile, when the output program 65 receives selection of one of the plug-in icons 121 to 124 via the user interface 54 ("PLUG-IN ICON" in STEP S13 or S17), in STEP S23, the output program activates an external program corresponding to the selected plug-in icon. The processing of STEP S23 is an example of an activation processing. In the present embodiment, on the assumption that the plug-in icon 121 is selected, the following description will be continued.

For example, activation of the external program can be implement by an API (hereinafter, referred to as the "activation API") which the OS 64 provides. The output program 65 designates, for example, the program ID of the map program 66, as a parameter, and executes the activation API. When the activation API is executed, the OS 64 activates the map program 66 and executes the map program in the foreground, and executes the output program 65 in the background. However, the method of activating an external program is not limited thereto, and may use, for example, a so-called sharing function which the Android OS provides.

Figure 11B:
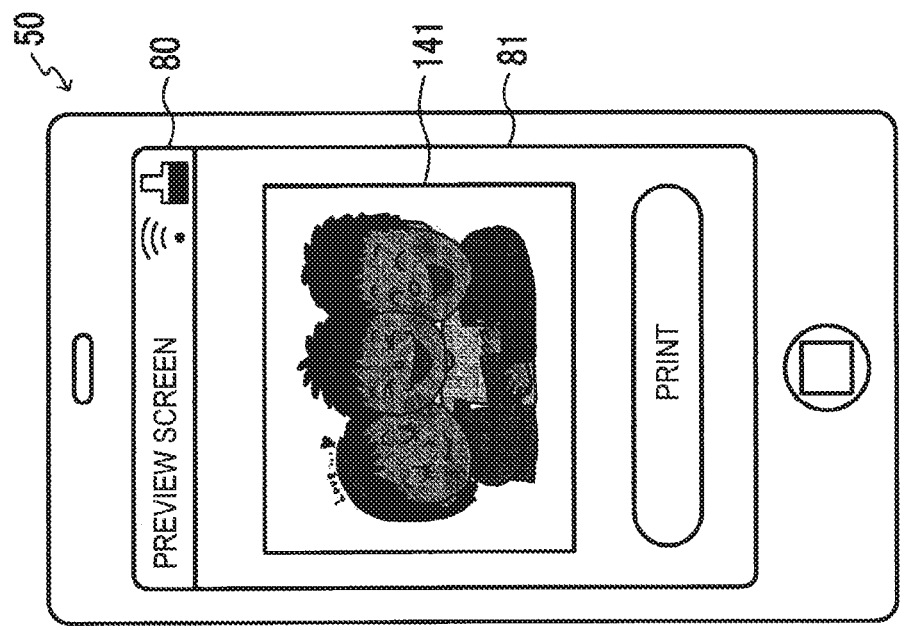

When the map program 66 is activated by the OS 64, it controls the display 53 to display a map designation screen. FIG. 11B shows an example of the map designation screen. A map designation screen shown in FIG. 11B includes a map display area 142, and a "PREVIEW" icon. In this case, the map program 66 receives user's operations on the map display area 142 and the "PREVIEW" icon, via the user interface 54.

In the map display area 142, a part of a map image which the map program 66 can display is displayed. When the map program 66 is activated, in the map display area 142, for example, a map image 143 including the current location of the portable terminal 50 acquired from a GPS is displayed. For example, the map program 66 acquires map image data representing the map image 143, as a display object, from a server (not shown) via the network interface 55. Specifically, the map program 66 transmits a map image data request to the server via the network interface 55, and receives the map image data as a response from the server via the network interface 55.

Thereafter, when the map program 66 receives a user's operation on position of the map display area 142 via the user interface 54, it changes the map image 143 to be displayed in the map display area 142. The map program 66 acquires map image data representing the changed map image 143 from the server. For example, the map image 143 which is displayed in the map display area 142 is slid in response to a slide operation, and is reduced in response to a pinch-in operation, and is enlarged in response to a pinch-out operation.

Also, when the map program 66 receives selection of the "PREVIEW" icon via the user interface 54, it stores the map image data representing the map image 143 displayed in the map display area 142, in the data storage area 62B. Subsequently, the map program 66 notifies the data ID of the map image data stored in the data storage area 62B, as a return value of the activation API, to the output program 65, and finishes processing as a plug-in. As a result, the OS 64 executes the output program 65 in the foreground again.

When the output program 65 is executed in the foreground again by the OS 64, it acquires the data ID of the map image data as the return value of the activation API ("Yes" in STEP S24). Subsequently, the output program 65 temporarily stores the acquired data ID as a designation data ID in the data storage area 62B. The processing of STEP S24 is an example of an acquiring processing. The data ID acquired as the return value of the activation API is an example of designation information. Subsequently, the output program 65 performs the processing of STEP S20 and the subsequent steps. In this case, the preview image is an image which will be obtained by recording the map image 143 on a recording sheet. The others are the same as those in the above described processing, and will not be described again.

Also, although not shown, when the output program 65 receives selection of the operation icon 117 shown in FIG. 9B, via the network interface 55 ("OPERATION ICON" in STEP S13, the output program generates a phone number acquisition source selection screen for making the user select an acquisition source of, for example, a phone number specifying an external device which is a FAX transmission destination, in STEP S15, and controls the display 53 in STEP S16 to display the generated phone number acquisition source selection screen. The phone number acquisition source selection screen is an example of a selection screen or a second program selection screen which is displayed when the operation icon 117 is selected.

The phone number acquisition source selection screen includes only the FAX area 126, corresponding to the FAX transmitting operation which is the designation operation, of the icon areas 125, 126, and 127, and does not include the print icon area 125 and the dedicated icon area 127. In other words, the phone number acquisition source selection screen includes only the plug-in icon 124, which is disposed in the FAX area 126, of the plug-in icons 121 to 124, and does not include the plug-in icons 121, 122, and 123 which are disposed in the print icon area 125 and the dedicated icon area 127.

Meanwhile, when the output program 65 receives selection of the plug-in icon 124 via the user interface 54 ("PLUG-IN ICON" in STEP S13 or S17), in STEP S23, the output program activates the program "C" using the activation API. Subsequently, in STEP S24, the output program 65 acquires FAX data generated by the program "C", and a phone number which is designated by the user from the program "C", as return values of the activation API. The phone number acquired as a return value of the activation API is an example of the designation information.

Meanwhile, when the output program 65 receives designation of content data to be used in the FAX transmitting operation by a processing (not shown), in STEP S20, the output program controls the display 53 to display a preview screen. In this case, the preview screen is an image which will be obtained by faxing the content data to a designation device and recording the content data on a recording sheet by the designation device. Also, the corresponding preview screen includes a. "FAX" icon. The "FAX" icon is an example of an output instructing object corresponding to an instruction for making the designation device perform the FAX transmitting operation of the designation data.

In this case, when the output program 65 receives selection of the "FAX" icon via the user interface 54 ("Yes" in STEP S21), in STEP S22, the output program transmits FAX instructing information to the designation device via the network interface 55. The FAX instructing information is an example of output instructing information for making the designation device perform the FAX transmitting operation of the designation data. The FAX instructing information of the present embodiment includes the designation data, the designation operation ID of the FAX transmitting operation, and the phone number specifying the external device which is the FAX transmission destination. Also, the FAX instructing information may include a designation data ID such as a URL, not the designation data.

Also, although not shown, the control program 35 receives the FAX instructing information from the portable terminal via the network interface 25. Further, the control program 35 controls the FAX unit 13 such that the FAX unit performs the FAX transmitting operation according to the received FAX instructing information. In other words, the FAX unit 13 faxes the map image data included as content data in the FAX instructing information, to the external device specified by the phone number.

According to the above described embodiment, since the display modes of the plug-in icons 121 to 124 on the selection screen are determined based on the attribute information, it becomes possible for the user to easily find one of the plug-in icons 121 to 124 corresponding to an external program for implementing a desired processing. Also, examples of the display mode of each of the plug-in icons 121 to 124 include whether to display the corresponding plug-in icon, whether to display the corresponding plug-in icon such that the corresponding plug-in is selectable, the display position of the corresponding plug-in icon on the selection screen, and the display order of the corresponding plug-in icon in the plurality of plug-in icons 121 to 124.

Also, in the above described embodiment, each of the plug-in icons 121 to 124 is displayed on the selection screen in a case where a corresponding first operation ID is identical with the second operation ID, and is not displayed on the selection screen in a case where the corresponding first operation ID is not identical with the second operation ID. Therefore, only external programs corresponding to output operations, which is able to be performed by designation device, become selectable. As a result, it becomes possible for the user to easily find an external program for implementing a desired processing. Meanwhile, in a case where any designation device has not been designated, it is preferable to determine a display mode in which all of the plug-in icons 121 to 124 are selectable. As a result, it is possible to avoid a situation where it is impossible to select an external program for implementing a desired processing.

Also, in the above described embodiment, an example in which the inactive plug-in icon 124 is not displayed has been described. However, the display mode where the plug-in icon 124 is not selectable is not limited thereto. For example, the inactive plug-in icon 124 may be grayed out on the selection screen. In this case, even via the output program 65 receives selection of the plug-in icon 124 grayed out, via the user interface 54, the output program does not need to perform the activation processing. The mode in which the plug-in icon 124 is grayed out is an example of a mode in which the plug-in icon 124 is not selectable.

Also, like in the above described embodiment, in a case where the device selecting processing is performed, it is preferable to re-determine the display modes of the plug-in icons 121 to 124 according to output operations which the changed designation device is able to perform. Further, when the plug-in icon 124 becomes selectable due to changing of the designation device, the plug-in icon 124 is displayed in a display mode different from that of the other plug-in icons 121 to 123, such that the plug-in icon 124 can easily catch the eye of the user. As a result, it becomes easier for the user to find an external program newly installed, for example, in the portable terminal 50.

Also, in the above described embodiment, the operation icon 116 and the plug-in icons 121 and 122 associated with the printing operation are disposed close together, and the operation icon 117 and the plug-in icon 124 associated with the FAX transmitting operation are disposed close together. Further, the plug-in icon 123 of the external program about which it is unclear what output operation corresponds to the external program is disposed in the dedicated icon area 127 different from the print icon area 125 and the FAX area 126. As described above, icons associated with a common output operation are displayed in a group. Therefore, it becomes easier for the user to find an external program for implementing a desired processing. Further, in each of the icon areas 125, 126, and 127, plug-in icons are rearranged based on their priorities. Therefore, it becomes easier for the user to find a plug-in icon having a high priority.

Moreover, according to the above described embodiment, not only on the main screen, but also on the data acquisition source selection screen which is displayed when the operation icon 116 is selected, or on the phone number acquisition source selection screen which is displayed when the operation icon 117 is selected, the plug-in icons are displayed. Also, on a screen which is displayed after a designation operation is designated, only plug-in icons associated with the corresponding designation operation are displayed. Therefore, it becomes easier for the user to find an external program for implementing a desired processing. However, determination on whether to display each of the plug-in icons 121 to 124 on which screen is not limited to the above described example.

For example, a program information record may further include the screen IDs of screens in which corresponding plug-in icons is to be included. The screen IDs are examples of screen identification information. In this case, when the screen ID of a screen which is generated in a screen generating processing is included in the program information record, the output program 65 may activate corresponding plug-in icons. Meanwhile, when the screen ID of a screen which is generated in a screen generating processing is not included in the program information record, the output program 65 may deactivate corresponding plug-in icons. For example, in order to implement the display modes of the above described embodiment, the program IDs "001" and "002" need to be associated with the screen IDs of the main screen and the data acquisition source selection screen, and the program ID "003" needs to be associated with the screen ID of the main screen, and the program ID "004" needs to be associated with the screen IDs of the main screen and the phone number acquisition source selection screen.

Also, an example in which, in the portable terminal 50 of the above described embodiment, various programs stored in the program storage area 62A of the memory 62 are executed by the CPU 61, whereby individual processing to be performed by the controller of this disclosure are implemented has been described. However, the configuration of the controller is limited thereto, and the whole or a part of the controller may be implemented by hardware such as an IC and the like.

Further, this disclosure can be implemented as the portable terminal 50, and can also be implemented as a program making the portable terminal 50 perform the processing. Furthermore, the corresponding program may be recorded in non-transitory recording media to be provided. The non-transitory recording media may include not only CD-ROMs and DVD-ROMs but also a memory mounted on a server which can be connected to the portable terminal 50 via the communication network 101. Further, the program stored in the memory of the server may be distributed as information or a signal representing the corresponding program, via the communication network 101 such as the Internet.

What is claimed is:

1. A non-transitory computer-readable medium storing output instructions to control a portable terminal including a display, a user interface, a memory, and a network interface, the network interface being configured to electrically connect to a plurality of content output devices, the output instructions, when executed by the portable terminal, causing the portable terminal to function as an output application, the memory being configured to store an operation system and a plurality of content source instructions, each of the content source instructions, when executed by the portable terminal, causing the portable terminal to function as each of a plurality of content applications;

the output application causing the portable terminal to perform processes comprising:
displaying, a plurality of options on the display, the options corresponding to the plurality of content output devices respectively; performing, in response to a device selecting operation of selecting one of the plurality of options via the user interface, storage control process of storing device identification information in the memory, the device identification information identifying the content output device corresponding to the selection, wherein the output application supports a plurality of output processes, each of the plurality of content output devices is able to execute any output processes of the plurality of output processes supported by the output application, the output process executable by the plurality of the content output devices is different depending on the content output device, and the plurality of output processes is a process of outputting a content represented by a content data;

displaying, a plurality of options on the display, the options corresponding to the plurality of the output processes supported by the output application respectively; receiving a process selecting operation to select any of the plurality of the options via the user interface;

displaying, a plurality of options on the display, the options corresponding to the plurality of the content data respectively; receiving a content selecting operation to select any of the plurality of the options via the user interface;

performing a first transmission process of transmitting a first command to the selected device via the network interface, the first command instructing to output a first content by a first process, the selected device being a content output device identified by the device identification information stored in the memory by the storage control process, the first process being an output process indicated by an option selected by the process selecting operation, the first content being a content represented by a content data indicated by an option selected in the content selecting operation;

performing an installed application specifying process of specifying a plurality of installed content applications, each installed content application being an application installed in the portable terminal, of the plurality of content applications corresponding to the output application;

performing, for each of the plurality of installed content applications, a process identification information acquiring process of acquiring process identification information, the installed content application being an application specified in the installed application specifying process, wherein each of the plurality of the installed content applications supports any output process of the plurality of the output processes supported by the output application, the output process supported by the plurality of the installed content applications is different depending on the content application, and the process identification information is information indicating that the content application supports any output processes of the plurality of the output processes supported by the output application;

determining, for each of the plurality of the installed content applications specified in the installed application specifying process, whether the output process executable by the selected device is included in the any output processes indicated by the process identification information, the selected device being a content output device identified by the device identification information stored in the memory by the storage control process, the process identification information is process identification information acquired by the process identification information acquiring process;

performing, for each of the plurality of the installed content applications specified in the installed application specifying process, an activatable specifying process, wherein when the output process executable by the selected device is included in the any output processes indicated by the process identification information, it is specified in the activatable specifying process that the content application is activatable, and when the output process executable by the selected device is not included in the any output processes indicated by the process identification information, it is not specified in the activatable specifying process that the content application is activatable;

controlling the display to display a selection screen, the selection screen including an activatable option corresponding to the installed content application that is specified as it is activatable in the activatable specifying process, of the plurality of the installed content applications specified in the installed application specifying process, and not including an activatable option corresponding to the installed content application that is not specified as it is activatable in the activatable specifying process, of the plurality of the installed content applications specified in the installed application specifying process, the activatable option being an option capable of activating an corresponding content application;

performing, in response to receiving an application selecting operation to select the activatable option included in the selection screen, activation process of activating the content application corresponding to the selected activatable option;

performing, content-data identification information acquiring process of acquiring content-data identification information that is output by the content application activated by the activation process, the content-data identification information being identification information to identify the content data used in the output process supported by the content application activated by the activation process; and performing a second transmission process of transmitting a second command to the selected device via the network interface, the second command instructing to output a second content by a second process, the selected device being a content output device identified by the device identification information stored in the memory the storage control process, the second process being an output process supported by the content application activated in the activation process, the second content is a content represented by a content data indicated by content-data identification information acquired by the content-data identification information acquiring process.

2. The non-transitory computer-readable medium according to claim 1, wherein the memory is configured to store device identification information identifying the output device which is the transmission destination of the output instructions, wherein the process identification information includes first process identification information identifying the process, which is corresponding to a content application, among the plurality of processes supported by the output application, wherein the output application cause the portable terminal to perform processes comprising:

acquiring, from the output device identified by the device identification information stored in the memory, second process identification information identifying the process, which is able to be performed by the identified output device, among the plurality of output processes supported by the output application;

determining whether the first process identification information is identical with the second process identification information;

deciding, when it is determined that the first process identification information is identical with the second process identification information, a display mode in which on option for the content application corresponding to the process identification information is able to be selected via the user interface; and deciding, when it is determined that the first process identification information is not identical with the second process identification information, a display mode in which the option for the content application corresponding to the process identification information is not able to be selected via the user interface.

3. The non-transitory computer-readable medium according to claim 2, wherein the output application cause the portable terminal to perform processes comprising:

determining whether any device identification information is stored in the memory;

determining whether the first process identification information is identical with the second process identification information is performed when it is determined that device identification information is stored; and deciding, when it is determined that any device identification information is not stored, a display mode in which all of the options corresponding to the plurality of content applications is able to be selected via the user interface.

4. The non-transitory computer-readable medium according to claim 2, wherein the selection screen further includes a device designation object for receiving an instruction for designating a content output device as a transmission destination of the output application, wherein when the output application receives a user operation of selecting the device designation object, the output application causes the portable terminal to perform processes comprising:

specifying content output devices being able to perform communication via the network interface;

receiving a user operation of designating one of the content output devices specified, via the user interface;

storing device identification information identifying the designated content output device, in the memory; and wherein the second process identification information is acquired and compared with the first process identification information, the deciding of the display mode and the displaying of the selection screen is performed after the user operation of designating one of the content output devices and the device identification information is stored in memory.

5. The non-transitory computer-readable medium according to claim 4, wherein a first display mode in which an option is able to be selected via the user interface is a mode in which the option is included in the selection screen, wherein a second display mode in which an option is not able to be selected via the user interface is a mode in which the option is not included in the selection screen, and wherein the output application causes the portable terminal to perform processes comprising:

displaying an option, which is decided just before the device identification information is changed in memory, to be not included in the selection screen and which is determined just after the device identification information is changed in memory, to be included in the selection screen, in a display mode different from that of other options which are included in the selection screen.

6. The non-transitory computer-readable medium according to claim 1, wherein the processes include a first process, and a second process different from the first process, wherein the process identification information includes first process identification information identifying processes, each of which corresponds to each content application, among the plurality of processes, wherein the selection screen further includes a first option which is an process designation object corresponding to the first process, and a second option which is an process designation object corresponding to the second process, wherein the output application cause the portable terminal to perform processes comprising:

transmitting, in response to a user operation of selecting one of the process designation objects, the output application for making the content output device perform an output process corresponding to the selected process designation object, to the content output device via the network interface;

deciding, the display position of the process designation object of content applications corresponding to process identification information including the process identification information identifying the first process, in a first display area adjacent to the first option; and deciding, the display position of the process designation object of content applications corresponding to process identification information including the process identification information identifying the second process, in a second display area adjacent to the second option.

7. The non-transitory computer-readable medium according to claim 6, wherein the output application cause the portable terminal to perform processes comprising:

deciding, the display position of the process designation object of content applications corresponding to process identification information which does not include any process identification information, in a third display area different from the first display area and the second display area.

8. The non-transitory computer-readable medium according to claim 1, wherein the processes include a first process, and a second process different from the first process, wherein the selection screen includes:

an process selection screen that includes a first option which is an process designation object corresponding to the first process, and a second option which is an process designation object corresponding to the second process;

a first instructions selection screen that is displayed on the display when the output application receives a user operation of selecting the first option; and a second instructions selection screen that is displayed on the display when the output application receives a user operation of selecting the second option, wherein the process identification information further is screen identification information specifying a selection screen in which an corresponding option is to be displayed, and wherein the output application causes the portable terminal to perform processes comprising:

deciding, to control the display to display the options corresponding to the process identification information, respectively, on the selection screen identified by the screen identification information included in the process identification information.

9. The non-transitory computer-readable medium according to claim 1, wherein the process identification information includes instructions information representing priorities, and wherein the output application cause the portable terminal to perform processes comprising:

deciding, when the plurality of installed content applications is specified, the arrangement order of the plurality of the installed content applications on the selection screen to the descending order of the priorities represented by the instructions information.

10. A portable terminal comprising:

a display;

a user interface;

a memory;

a network interface configured to electrically connect to a plurality of content output devices; and a controller performs processes including:

displaying, a plurality of options on the display, the options corresponding to the plurality of content output devices respectively; performing, in response to a device selecting operation of selecting one of the plurality of options via the user interface, storage control process of storing device identification information in the memory, the device identification information identifying the content output device corresponding to the selection, wherein the output application supports a plurality of output processes, each of the plurality of content output devices is able to execute any output processes of the plurality of output processes supported by the output application, the output process executable by the plurality of the content output device is different depending on the content output device, and the plurality of output processes is a process of outputting a content represented by a content data;

displaying, a plurality of options on the display, the options corresponding to the plurality of the output processes supported by the output application respectively; receiving a process selecting operation to select any of the plurality of the options via the user interface;

displaying, a plurality of options on the display, the options corresponding to the plurality of the content data respectively; receiving a content selecting operation to select any of the plurality of the options via the user interface;

performing a first transmission process of transmitting a first command to the selected device via the network interface, the first command instructing to output a first content by a first process, the selected device being a content output device identified by the device identification information stored in the memory by the storage control process, the first process being an output process indicated by an option selected by the process selecting operation, the first content being a content represented by a content data indicated by an option selected in the content selecting operation;

performing an installed application specifying process of specifying a plurality of installed content applications, each installed content application being an application installed in the portable terminal, of the plurality of content applications corresponding to the output application;

performing, for each of the plurality of installed content applications, a process identification information acquiring process of acquiring process identification information, the installed content application being an application specified in the installed application specifying process, wherein each of the plurality of the installed content applications supports any output process of the plurality of the output processes supported by the output application, the output process supported by the plurality of the installed content applications is different depending on the installed content application, and the process identification information is information indicating that the installed content application supports any output processes of the plurality of the output processes supported by the output application;

determining, for each of the plurality of the installed content applications specified in the installed application specifying process, whether the output process executable by the selected device is included in the any output processes indicated by the process identification information, the selected device being a content output device identified by the device identification information stored in the memory by the storage control process, the process identification information is process identification information acquired by the process identification information acquiring process;

performing, for each of the plurality of the installed content applications specified in the installed application specifying process, an activatable specifying process, wherein when the output process executable by the selected device is included in the any output processes indicated by the process identification information, it is specified in the activatable specifying process that the content application is activatable, and when the output process executable by the selected device is not included in the any output processes indicated by the process identification information, it is not specified in the activatable specifying process that the content application is activatable;

controlling the display to display a selection screen, the selection screen including an activatable option corresponding to the content application that is specified as it is activatable in the activatable specifying process, of the plurality of the installed content applications specified in the installed application specifying process, and not including an activatable option corresponding to the content application that is not specified as it is activatable in the activatable specifying process, of the plurality of the installed content applications specified in the installed application specifying process, the activatable option being an option capable of activating an corresponding content application;

performing, in response to receiving an application selecting operation to select the activatable option included in the selection screen, activation process of activating a content application corresponding to the selected activatable option;

performing, content-data identification information acquiring process of acquiring content-data identification information that is output by the content application activated by the activation process, the content-data identification information being identification information to identify the content data used in the output process supported by the content application activated by the activation process; and performing a second transmission process of transmitting a second command to the selected device via the network interface, the second command instructing to output a second content by a second process, the selected device being a content output device identified by the device identification information stored in the memory the storage control process, the second process being an output process supported by the content application activated in the activation process, the second content is a content represented by a content data indicated by content-data identification information acquired by the content-data identification information acquiring process.

* * * * *